US012780994B2

(12) United States Patent
Taguchi et al.

(10) Patent No.: US 12,780,994 B2

(45) Date of Patent: Nov. 3, 2026

(54) THERMOPLASTIC RESIN, COMPOSITION, MOLDED ARTICLE, OPTICAL LENS, AND METHOD FOR PRODUCING THERMOPLASTIC RESIN

(71) Applicant: MITSUBISHI GAS CHEMICAL COMPANY, INC., Tokyo (JP)

(72) Inventors: Daisuke Taguchi, Tokyo (JP); Kohei Kamatani, Tokyo (JP); Hisato Akimoto, Tokyo (JP); Kazuyoshi Uera, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 697 days.

(21) Appl. No.: 18/027,164

(22) PCT Filed: Sep. 22, 2021

(86) PCT No.: PCT/JP2021/034678

§ 371 (c)(1),
(2) Date: Mar. 20, 2023

(87) PCT Pub. No.: WO2022/065329

PCT Pub. Date: Mar. 31, 2022

(65) Prior Publication Data

US 2023/0331925 A1 Oct. 19, 2023

(30) Foreign Application Priority Data

Sep. 23, 2020 (JP) ................................ 2020-158565
Mar. 1, 2021 (JP) ................................ 2021-032032

(51) Int. Cl.

| | |
|---|---|
| ***C08G 77/52*** | (2006.01) |
| ***C08G 64/08*** | (2006.01) |
| ***C08G 64/18*** | (2006.01) |
| ***C08G 65/40*** | (2006.01) |
| ***C08G 77/08*** | (2006.01) |
| ***C08G 77/42*** | (2006.01) |
| ***C08G 77/448*** | (2006.01) |
| ***C08L 69/00*** | (2006.01) |
| ***C08L 83/00*** | (2006.01) |

(Continued)

(52) U.S. Cl.

CPC ........... *C08G 77/52* (2013.01); *C08G 64/085* (2013.01); *C08G 64/18* (2013.01); *C08G 65/4006* (2013.01); *C08G 77/08* (2013.01); *C08G 77/42* (2013.01); *C08G 77/448* (2013.01); *C08L 69/00* (2013.01); *C08L 83/00* (2013.01); *C08L 83/14* (2013.01); *G02B 1/041* (2013.01)

(58) Field of Classification Search

CPC ...... C08G 77/52; C08G 64/085; C08G 64/18; C08G 65/4006; C08G 77/08; C08G 77/42; C08G 77/448; C08L 83/14; C08L 69/00; C08L 83/00; G02B 1/041

See application file for complete search history.

(56) References Cited

U.S. PATENT DOCUMENTS 4,026,827 A 5/1977 Steffen
4,172,806 A * 10/1979 Vincent ................ C07F 7/0838
252/573

(Continued)

FOREIGN PATENT DOCUMENTS

JP 39-6400 B1 5/1964
JP 3-47842 A 2/1991

(Continued)

OTHER PUBLICATIONS

Pacansky et al., "Synthesis and Thermomechanical Properties of Alternating Copolymers Containing Bisphenol-A", Journal of Polymer Science, vol. 18, 1980, pp. 3119-3127.

Dunnavant et al., "Synthesis of Polyaryloxysilanes by Melt-Polymerizing Dianilino- and Diphenoxysilanes with Aromatic Diols", Journal of Polymer Science Part A-1: vol. 5, 1967, pp. 707-724.

(Continued)

*Primary Examiner* — Marc S Zimmer
*Assistant Examiner* — Virginia L Stonehocker
(74) *Attorney, Agent, or Firm* — GREENBLUM & BERNSTEIN, P.L.C.

(57) ABSTRACT

The problem of the present invention is to provide: a thermoplastic resin having excellent heat resistance and excellent flame retardancy and having a siloxane constituent unit, particularly a thermoplastic resin suitable for optical applications; a composition containing the thermoplastic resin; and others. The problem is solved by a thermoplastic resin containing a structural unit (A) represented by general formula (I). (In general formula (I), Ra to Rct independently represent a hydrogen atom, a halogen atom, an alkyl group having 1 to 20 carbon atoms in total and optionally having a substituent, or an aryl group having 6 to 30 carbon atoms in total and optionally having a substituent; Xa and Xb independently represent an alkyl group having 1 to 20 carbon atoms in total and optionally having a substituent, or an aryl group having 6 to 30 carbon atoms in total and optionally having a substituent; the substituent is any one of a halogen atom, a cyano group, an alkenyl group, an alkynyl group and an alkoxy group; and m represents an integer of 1 to 3.)

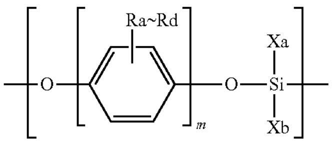

(I)

27 Claims, 5 Drawing Sheets

(51) Int. Cl.
*C08L 83/14* (2006.01)
*G02B 1/04* (2006.01)

(56) References Cited

U.S. PATENT DOCUMENTS

| | | | | |
|---|---|---|---|---|
| 5,041,514 | A | 8/1991 | Webb et al. | |
| 5,633,332 | A | 5/1997 | Land et al. | |
| 6,407,193 | B1 * | 6/2002 | Hiiro | C08G 64/186 528/25 |
| 6,753,401 | B1 | 6/2004 | Reddy et al. | |
| 2013/0267665 | A1 | 10/2013 | Huggins et al. | |
| 2016/0244559 | A1 | 8/2016 | Meyer et al. | |
| 2018/0009986 | A1 * | 1/2018 | Meyer | C08K 5/02 |
| 2022/0033655 | A1 | 2/2022 | Uera et al. | |

FOREIGN PATENT DOCUMENTS

| | | | |
|---|---|---|---|
| JP | 8-502537 | A | 3/1996 |
| JP | 2015-512999 | A | 4/2015 |
| JP | 2016-532733 | A | 10/2016 |
| WO | 01/30787 | A1 | 5/2001 |
| WO | 2020/196343 | A1 | 10/2020 |

OTHER PUBLICATIONS

International Search Report issued Deccember 14, 2021 in International Bureau of WIPO Patent Application No. PCT/JP2021/034678, along with an English translation thereof.

Written Opinion issued Deccember 14, 2021 in International Bureau of WIPO Patent Application No. PCT/JP2021/034678, along with an English translation thereof.

* cited by examiner

[Figure 1]
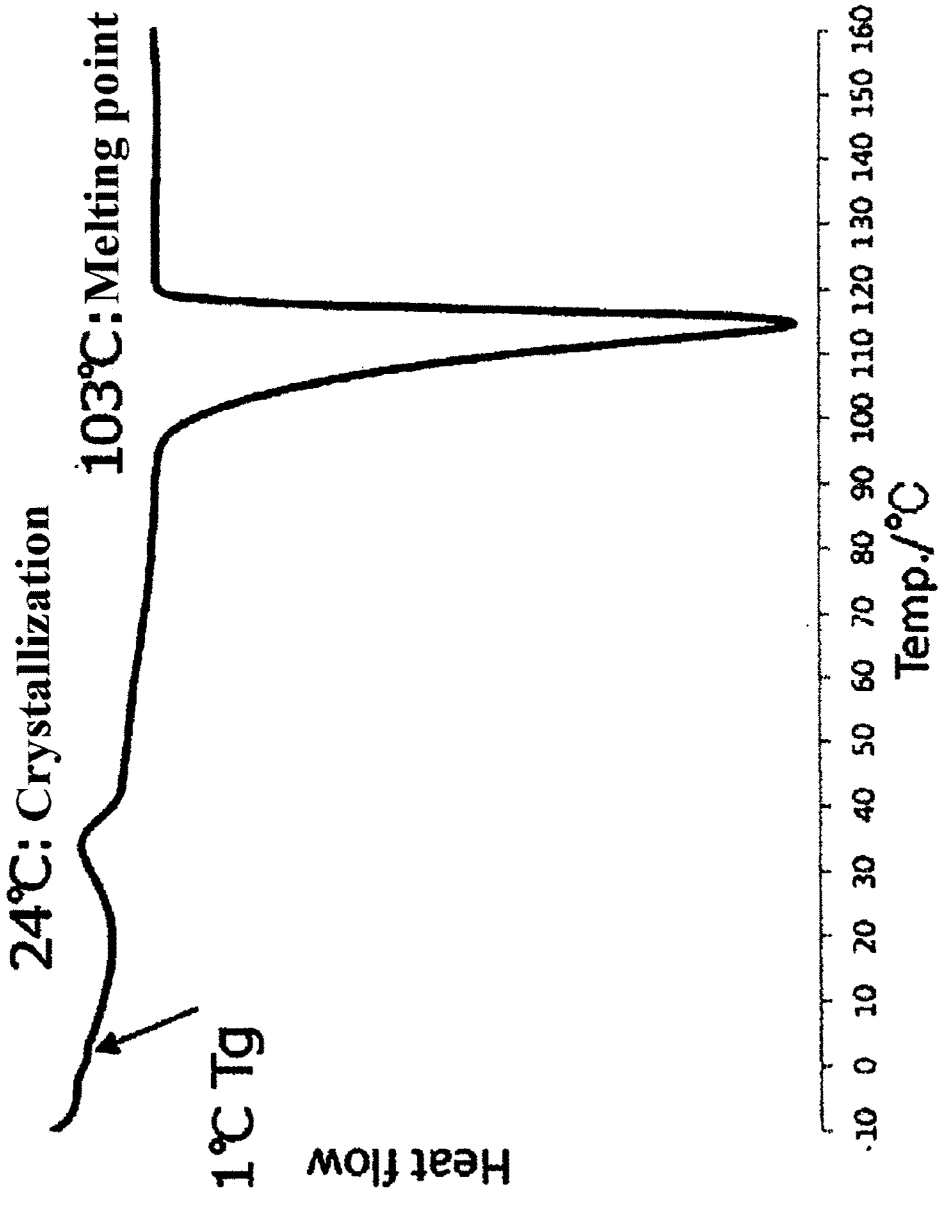

[Figure 2]
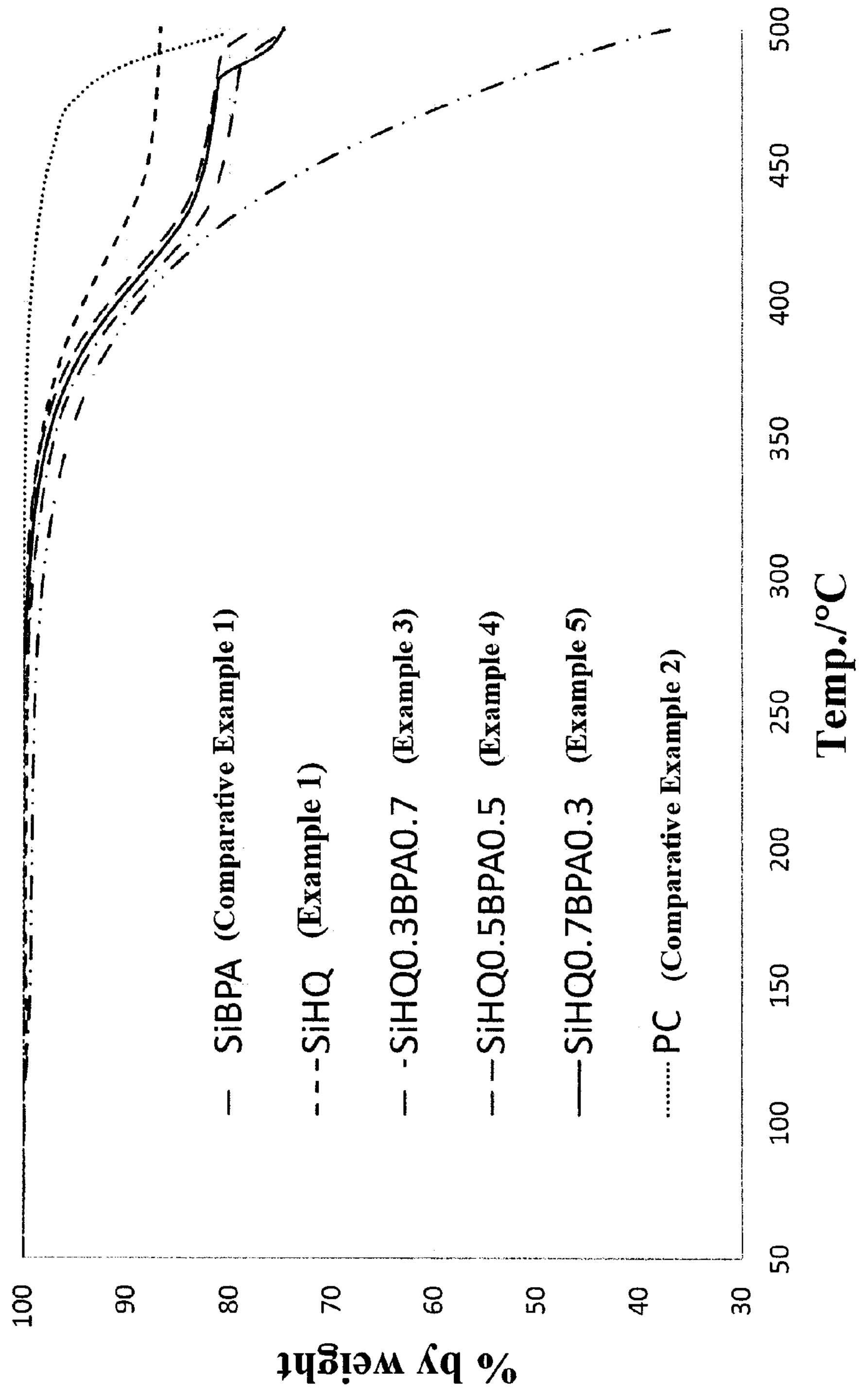

[Figure 3]
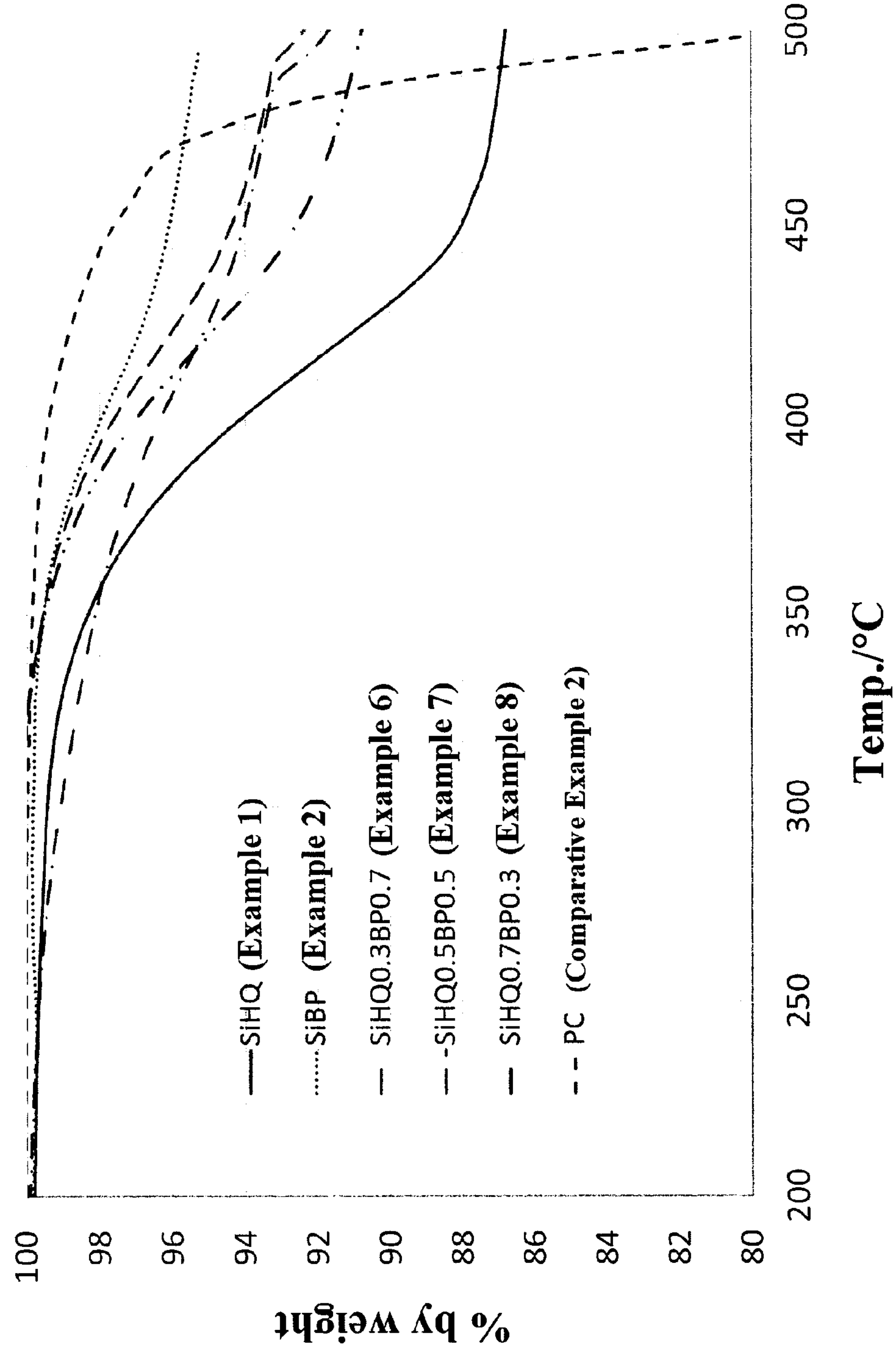

[Figure 4]
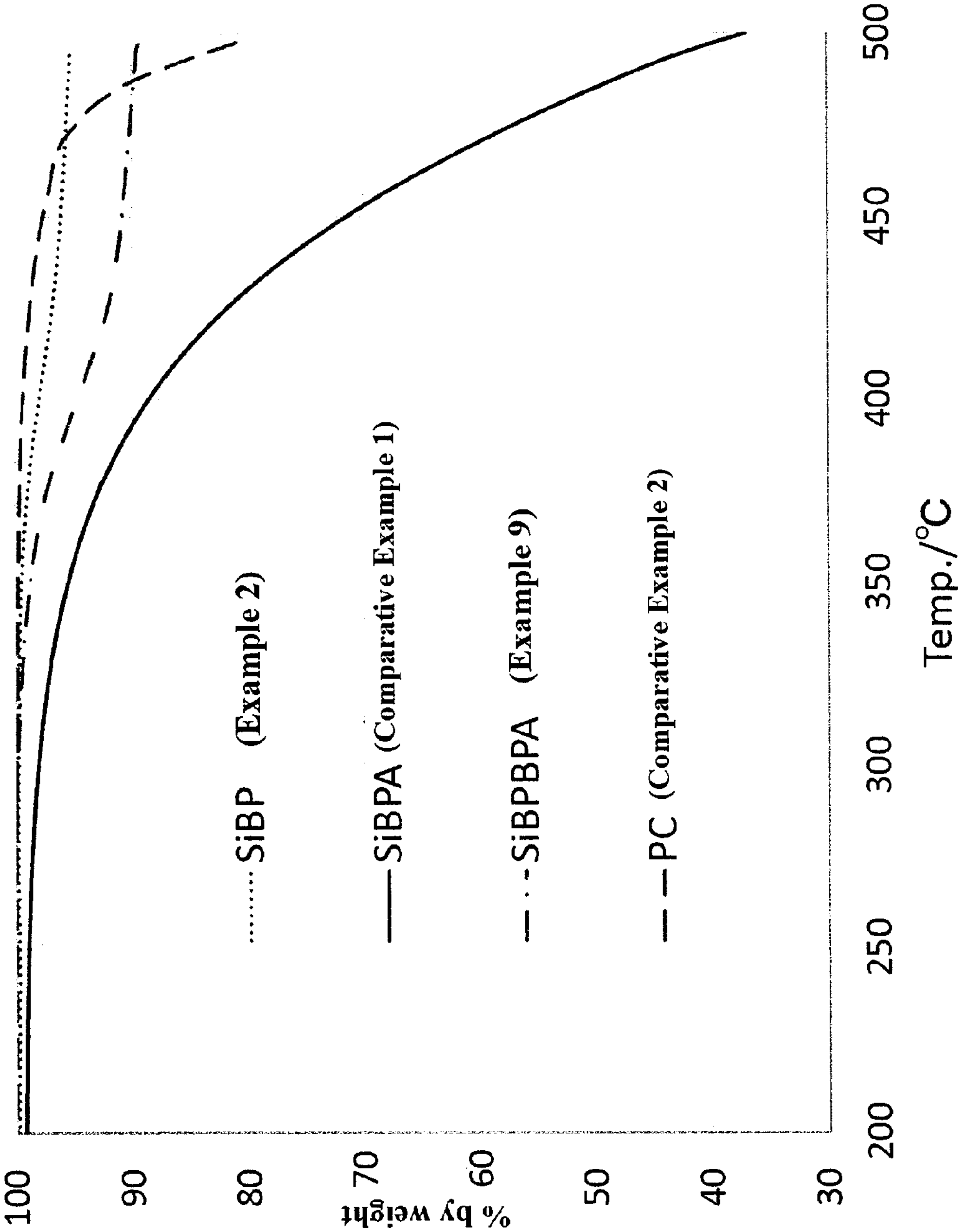

[Figure 5]
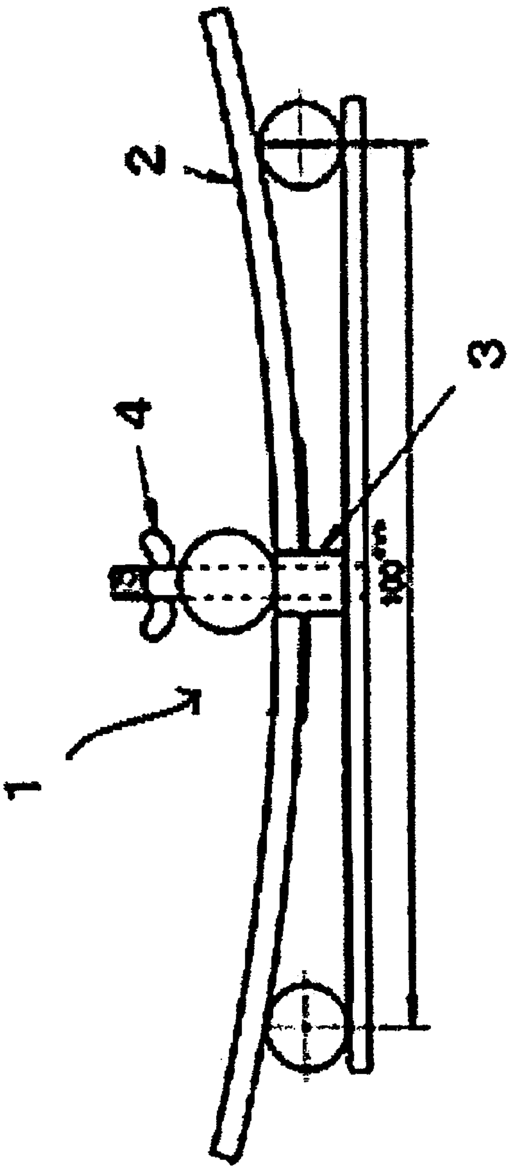

THERMOPLASTIC RESIN, COMPOSITION, MOLDED ARTICLE, OPTICAL LENS, AND METHOD FOR PRODUCING THERMOPLASTIC RESIN

TECHNICAL FIELD

The present invention relates to a thermoplastic resin, a composition including a thermoplastic resin, a method for producing a thermoplastic resin, and the like.

BACKGROUND ART

Thermoplastic resins are formed into a variety of molded products by processing methods that are simple and highly productive, such as injection molding, and are utilized in a wide range of industrial fields, such as electrical and electronics, OA equipment, heavy electrical machinery, precision machinery, and automotive fields.

However, sufficiently high heat resistance and flame retardancy have not necessarily been realized in conventional thermoplastic resins. Conventional thermoplastic resins may have poor chemical resistance as well.

Polymers of aromatic polysiloxane, also referred to as so-called polyarylenesiloxane, are known as materials for molded products (for example, Patent Literature 1). In recent years, the importance of polysiloxane compounds such as polyarylenesiloxane has been growing, and polyarylenesiloxane is used as, for example, release layers in photocopying, photoresist materials, plasticizers for polycarbonate, or components in powder surface coating systems.

Polysiloxane compounds such as polyarylene siloxanes tend to have relatively high heat resistance and flame retardancy, but it is not necessarily the case that these performances are sufficiently excellent.

Also, known methods for producing polysiloxane compounds include a method in which dimethyldichlorosilane and bisphenol A are allowed to react in a solvent, resulting in generation of hydrochloric acid (Non Patent Literature 1), and a method in which the reaction is carried out in a solvent to which acetic acid has been added (Patent Literature 2), but it has been desired that safety be ensured.

In addition, thermoplastic resins particularly suited for particular applications including optical applications, such as polysiloxane compounds, have not necessarily been realized to date.

PRIOR ART DOCUMENTS

Patent Documents

Patent Literature 1: Japanese Translation of PCT International Application Publication No. 1996(H08)-502537

Patent Literature 2: Japanese Translation of PCT International Application Publication No. 2015-512999

Non Patent Literature

Non Patent Documents

Non Patent Literature 1: Journal of Polymer Science, Vol. 18, 3119-3127 (1980)

SUMMARY OF THE INVENTION

Problems to be Solved by the Invention

The present invention provides: a thermoplastic resin having a siloxane constituent unit with excellent heat resistance and flame retardancy, in particular a thermoplastic resin suited for optical applications; a composition including such a thermoplastic resin; and the like.

Further, the present invention provides a safe and efficient method for producing a thermoplastic resin having a siloxane constituent unit, and the like. That is, the present invention provides a method for efficiently producing a thermoplastic resin having a siloxane constituent unit without producing a corrosive substance such as hydrochloric acid or acetic acid, and without requiring the use of a solvent, while enabling a reduction in environmental burden.

Solution to Problem

The present invention provides a thermoplastic resin described below that includes a siloxane constituent unit and has excellent heat resistance and flame retardancy, a composition including a thermoplastic resin, a molded body, and the like.

The present invention also provides a method for producing a thermoplastic resin including a siloxane constituent unit. The production method of the present invention does not generate a by-product with high environmental burden, such as an acid, and can be performed with no solvent, especially with no solvent that requires safety considerations.

[1] A thermoplastic resin comprising a constituent unit (A) represented by the following general formula (I):

(I)

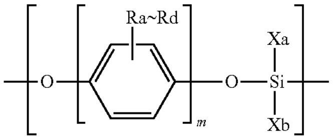

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent or an aryl group having 6 to 30 carbon atoms in total and optionally having a substituent;

the substituent is any of a halogen, a cyano group, an alkenyl group, an alkynyl group, and an alkoxy group; and m represents an integer of 1 to 3.

[2] The thermoplastic resin according to the above [1], further comprising at least one of constituent units (B-1) to (B-4) represented by any of the following formulas (II-1) to (II-4):

(II-1)

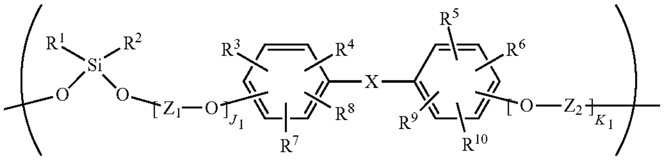

(II-2)

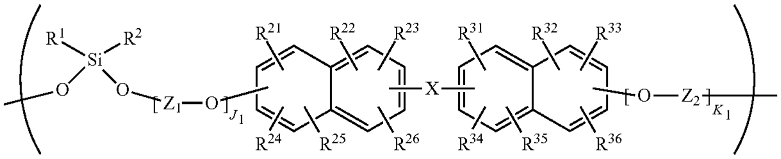

(II-3)

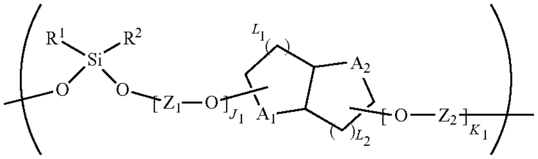

(II-4)

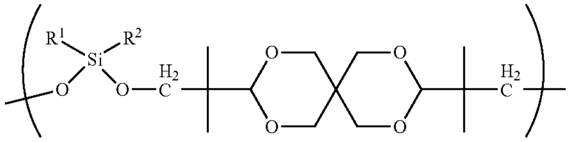

wherein $R^1$ and $R^2$ each independently represent an alkyl group having 1 to 20 carbon atoms and optionally having a substituent or an aryl group having 6 to 30 carbon atoms and optionally having a substituent;

$R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

$J_1$ each independently represents an integer of 0 to 5;

$K_1$ each independently represents an integer of 0 to 5;

the substituent is any of a halogen, a cyano group, an alkenyl group, an alkynyl group, and an alkoxy group;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

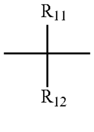

(2)

—S—

(3)

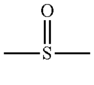

(4)

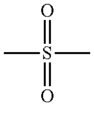

-continued (5)

—O—

(6)

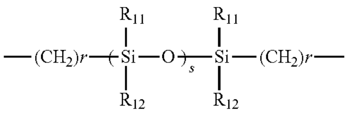

(7)

—$(CH_2)r$— wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

[3] The thermoplastic resin according to the above [1], wherein a molar ratio between the constituent unit (A) and the constituent units (B-1) to (B-4) in total is 0.1:99.9 to 100:0.

[4] The thermoplastic resin according to any of the above [1] to [3], further comprising at least one of constituent units (C-1) to (C-4) represented by any of the following formulas (III-1) to (III-4):

(III-1)

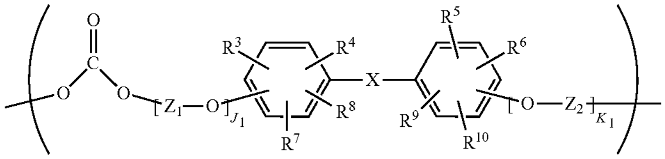

(III-2)

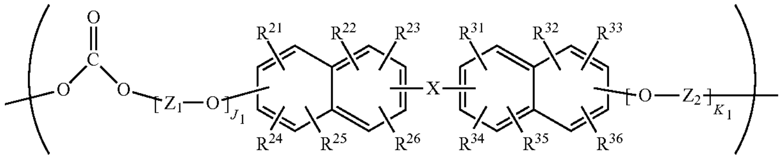

(III-3)

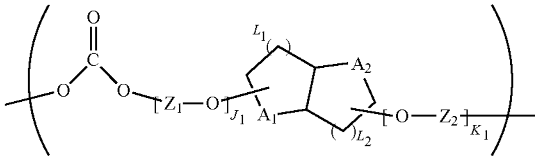

(III-4)

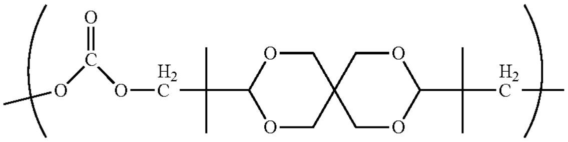

wherein $R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

the substituent is any of a halogen, a cyano group, an alkenyl group, an alkynyl group, and an alkoxy group;

$J_1$ each independently represents an integer of 0 to 5;

$K_1$ each independently represents an integer of 0 to 5;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

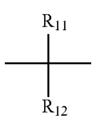

(2)

—S—

(3)

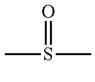

(4)

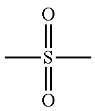

(5)

—O—

-continued (6)

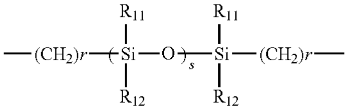

(7)

$-(CH_2)r-$ wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

[5] The thermoplastic resin according to the above [4], wherein a molar ratio between the constituent unit (A) and the constituent units (B-1) to (B-4) in total and the constituent units (C-1) to (C-4) in total is 0.1:99.9 to 100:0.

[6] The thermoplastic resin according to the above [1], consisting only of the constituent unit (A).

[7] The thermoplastic resin according to any of the above [1] to [6], wherein, in the general formula (I), $R_a$ to $R_d$ are each hydrogen and Xa and Xb are each a methyl group.

[8] The thermoplastic resin according to any of the above [1] to [7], having a weight average molecular weight (Mw) in terms of polystyrene of 10,000 to 300,000.

[9] The thermoplastic resin according to any of the above [1] to [8], wherein a low molecular weight compound having a weight average molecular weight of 1,000 or less accounts for 1% by weight or less.

[10] The thermoplastic resin according to the above [9], wherein a proportion calculated from a GPC area ratio of the low molecular weight compound having a weight average molecular weight of 1,000 or less is 1% by weight or less.

[11] The thermoplastic resin according to any of the above [1] to [10], having a 1% mass reduction thermal decomposition temperature of 300° C. or higher.

[12] The thermoplastic resin according to any of the above [1] to [11], having a weight reduction proportion at 500° C. of 40% or less.

[13] A composition comprising the thermoplastic resin according to any of the above [1] to [12] and a polycarbonate resin.

[13-1] The composition according to the above [13], wherein a Q value in the composition measured under conditions of 280° C. and 160 kgf, $Q_1$, is 120% or more of a Q value obtained by measuring only the polycarbonate resin included in the composition under the same conditions, $Q_2$.

[14] A molded body comprising the thermoplastic resin according to any of the above [1] to [12].

[15] An optical lens comprising the thermoplastic resin according to any of the above [1] to [12].

[16] An optical lens obtained by molding the composition according to the above [13].

[17] A method for producing a thermoplastic resin, comprising:

a polymerization step of polymerizing:

an oxysilane compound including at least any of a diaryloxysilane compound that is any of a dialkyldiaryloxysilane, a diaryldiaryloxysilane, and a monoalkylmonoaryldiaryloxysilane, and a dialkoxysilane compound that is any of a dialkyldialkoxysilane, a diaryldialkoxysilane, and a monoalkylmonoaryldialkoxysilane; and at least a diol compound represented by the following general formula (IV):

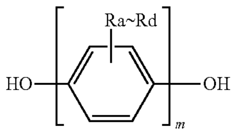

(IV)

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

the substituent is any of a halogen, a cyano group, an alkenyl group, an alkynyl group, and an alkoxy group; and m represents an integer of 1 to 3, wherein, in the polymerization step, the oxysilane compound and the diol compound are polymerized using a catalyst under reduced pressure in a molten state while a resulting aryl alcohol and/or alkyl alcohol is removed, and a thermoplastic resin including a constituent unit (A) represented by the following general formula (I) is produced:

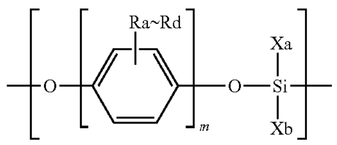

(I)

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent or an aryl group having 6 to 30 carbon atoms in total and optionally having a substituent;

the substituent is any of a halogen, a cyano group, an alkenyl group, an alkynyl group, and an alkoxy group; and m represents an integer of 1 to 3.

[18] The method for producing a thermoplastic resin according to the above [17], wherein a catalyst including an alkali metal compound and/or an alkaline earth metal compound is used in the polymerization step.

[19] The method for producing a thermoplastic resin according to the above [18], wherein the alkali metal compound and/or the alkaline earth metal compound includes a carbonate salt.

[20] The method for producing a thermoplastic resin according to the above [17], wherein a catalyst including a phosphorus compound is used in the polymerization step.

[21] The method for producing a thermoplastic resin according to the above [20], wherein the phosphorus compound includes a compound represented by the following general formula (8):

$$(PRe_4)^+(Xc)^- \quad (8)$$

wherein Re each independently represents an alkyl group, an aryl group, or an alkylaryl group, and a plurality of Re are optionally bonded to each other to form a ring structure; and Xc represents a hydroxyl group, a halogen atom, an alkyloxy group, an aryloxy group, an alkylcarbonyloxy group, an arylcarbonyloxy group, $HCO_3$, or $BRf_4$, where Rf is each independently a hydrogen atom, an alkyl group, or an aryl group.

[22] The method for producing a thermoplastic resin according to any of the above [17] to [21], wherein the thermoplastic resin has a weight average molecular weight of 10,000 to 300,000.

[23] The method for producing a thermoplastic resin according to any of the above [17] to [22], wherein an amount of the catalyst used in the polymerization step relative to the diol compound is $1.0\times10^{-7}$ to $1.0\times10^{-2}$ in a molar ratio.

[24] The method for producing a thermoplastic resin according to any of the above [17] to [23], wherein a reaction temperature in the polymerization step is in the range of 150° C. or higher and 300° C. or lower.

[25] The method for producing a thermoplastic resin according to any of the above [17] to [24], further comprising, in the polymerization step, a pressure reduction step in which a reaction pressure is decreased in stages from 24,000 Pa or more to less than 100 Pa.

[26] The method for producing a thermoplastic resin according to any of the above [17] to [25], wherein the oxysilane compound and the diol compound are polymerized under a pressure of less than 100 Pa in the polymerization step.

[27] The method for producing a thermoplastic resin according to any of the above [17] to [26], wherein no solvent is used in the polymerization step.

[28] The method for producing a thermoplastic resin according to any of the [17] to [27], wherein a ratio of the number of moles of the oxysilane compound to the number of moles of the diol compound used in the polymerization step is 0.9 or more and 1.2 or less.

[29] The method for producing a thermoplastic resin according to any one of the [17] to [28], further comprising:

a molecular weight measurement step of measuring a molecular weight of the thermoplastic resin produced in the polymerization step; and an additional polymerization step of repolymerizing the thermoplastic resin having a molecular weight lower than a specific target value.

Advantageous Effect of the Invention

According to the present invention, a thermoplastic resin having a siloxane constituent unit with excellent heat resistance and flame retardancy, in particular a thermoplastic resin suited for optical applications; and a composition and a molded body including such a thermoplastic resin can be realized.

Also, according to the present invention, a thermoplastic resin having a siloxane constituent unit and the like can be produced by a safe and efficient production method.

BRIEF DESCRIPTION OF DRAWINGS

FIG. 1 is a graph showing the DSC chart of the resin (SiHQ) obtained in Example 1-1.

FIG. 2 is a graph showing the relationship between the weight reduction temperature and the % by weight of the thermoplastic resins obtained in Examples 1-1 and 3 to 5 and Comparative Examples 1 and 2.

FIG. 3 is a graph showing the relationship between the weight reduction temperature and the % by weight of the thermoplastic resins obtained in Examples 1-1, 2, and 6 to 8 and Comparative Example 2.

FIG. 4 is a graph showing the relationship between the weight reduction temperature and the % by weight of the thermoplastic resins obtained in Examples 2 and 9 and Comparative Examples 1 and 2.

FIG. 5 is a side view illustrating the shape of the three-point bending load fixture used to evaluate the chemical resistance in each of the Examples and Comparative Examples.

EMBODIMENTS FOR CARRYING OUT THE INVENTION

At first, the thermoplastic resin of the present invention will be described in detail.

<1. Thermoplastic Resin>

[(I) Siloxane Constituent Unit: Constituent Unit (A)]

The thermoplastic resin of the present invention is a polymer having a siloxane constituent unit, and specifically, it includes at least a constituent unit (A) represented by the following formula (I).

[Chem. 8]

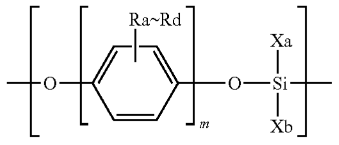

(I)

In general formula (I), $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent. The number of carbon atoms in total in the alkyl group optionally having a substituent is preferably 1 to 10, more preferably 1 to 5, and still more preferably 1 to 3. The number of carbon atoms in total in the aryl group optionally having a substituent is preferably 6 to 20, more preferably 6 to 15, and still more preferably 6 to 12.

$R_a$ to $R_d$ are preferably each a hydrogen atom, an alkyl group having 1 to 20 carbon atoms in total and optionally having a substituent, or an aryl group having 6 to 30 carbon atoms in total and optionally having a substituent, and are more preferably each a hydrogen atom.

In general formula (I), Xa and Xb each independently represent an alkyl group having 1 to 20 carbon atoms in total and optionally having a substituent or an aryl group having 6 to 30 carbon atoms in total and optionally having a substituent.

The number of carbon atoms in total in the alkyl group and the aryl group is the same as in $R_a$ to $R_d$.

Xa and Xb are preferably each a hydrogen atom or an alkyl group having 1 to 20 carbon atoms in total and optionally having a substituent, more preferably each a hydrogen atom or an alkyl group having 1 to 5 carbon atoms in total, and particularly preferably each a methyl group.

In general formula (I), the above-mentioned substituent is any of a halogen, a cyano group, an alkenyl group, an alkynyl group, and an alkoxy group; the number of carbon atoms in total in the alkenyl group and the alkynyl group is preferably 2 to 10, and more preferably 2 to 5; and the number of carbon atoms in total in the alkoxy group is preferably 1 to 10, and more preferably 1 to 5.

In general formula (I), m is an integer of 1 to 3, and preferably 1 or 2. That is, as the constituent unit (A), constituent units derived from hydroquinone or its derivatives (m=1), constituent units derived from 4,4'-biphenyldiol or its derivatives (m=2), and the like are preferable.

In the thermoplastic resin, as shown in formula (I), it is preferable that the structural unit be included in which the —(O[Ph(Ra to d)]m- moiety and the —(OSi(Xa)(Xb)-) moiety are repeated alternately. As described above, it is preferable that the thermoplastic resin be a random copolymer rather than a block copolymer that includes a part in which only the —(O[Ph(Ra to d)]m- moiety is repeated in a large number and a part in which only the —(OSi(Xa)(Xb)-) moiety is repeated in a large number.

For example, it is preferable that the thermoplastic resin have a value of n, which indicates the number of alternate repeats of the —(O[Ph(Ra to d)]m- moiety and the —(OSi(Xa)(Xb)-) moiety in the following general formula (Ia), of 10 or more, and it is preferable that the thermoplastic resin have more preferably 20 or more, still more preferably 30 or more, even more preferably 50 or more, and particularly preferably 100 or more structural units.

(Ia)

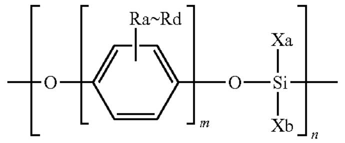

The thermoplastic resin with a large region in which the —(O[Ph(Ra to d)]m- moiety and the —(OSi(Xa)(Xb)-) moiety are linked alternately as described above, which is obtained by random copolymerization, is easier to form char at a high temperature compared to a block copolymer, and it is found to tend to have excellent heat resistance and flame retardancy.

[(II) Additional Siloxane Constituent Unit: Constituent Unit (B)]

The thermoplastic resin may be constituted solely by the above-mentioned constituent unit (A), but may also have another constituent unit.

For example, examples of the additional constituent unit for the thermoplastic resin include at least one of constituent units (B-1) to (B-4) represented by general formulas (II-1) to (II-4), respectively.

In general formulas (II-1) to (II-4), $R^1$ and $R^2$ each independently represent an alkyl group having 1 to 20 carbon atoms and optionally having a substituent or an aryl group having 6 to 30 carbon atoms and optionally having a substituent. The number of carbon atoms in total in the alkyl group optionally having a substituent is preferably 1 to 10, more preferably 1 to 5, and still more preferably 1 to 5. The number of carbon atoms in total in the aryl group optionally having a substituent is preferably 6 to 20, more preferably 6 to 15, and still more preferably 6 to 12.

In general formulas (II-1) and (II-2), $R^3$ to $R^{10}$, $R^{21}$ to $R^{26}$, and $R^{31}$ to $R^{36}$ are each independently a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent.

When $R^3$ to $R^{10}$, $R^{21}$ to $R^{26}$, and $R^{31}$ to $R^{36}$ are each an alkyl group optionally having a substituent, the number of carbon atoms in total is preferably 1 to 10, the number of carbon atoms in total is more preferably 1 to 4, and the number of carbon atoms in total is particularly preferably 1 or 2.

When $R^3$ to $R^{10}$, $R^{21}$ to $R^{26}$, and $R^{31}$ to $R^{36}$ are each an alkenyl group optionally having a substituent, the number of carbon atoms in total is preferably 2 to 10, the number of carbon atoms in total is more preferably 2 to 6, and the number of carbon atoms in total is particularly preferably 2 to 4.

Also, when $R^3$ to $R^{10}$, $R^{21}$ to $R^{26}$, and $R^{31}$ to $R^{36}$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

In general formulas (II-1) to (II-3), $Z_1$ and $Z_2$ are each independently an alkylene group having 1 to 5 carbon atoms and optionally having a substituent. $Z_1$ and $Z_2$ are preferably each an alkylene group having 1 to 3 carbon atoms, and more preferably each an alkylene group having 1 or 2 carbon atoms.

(II-1)

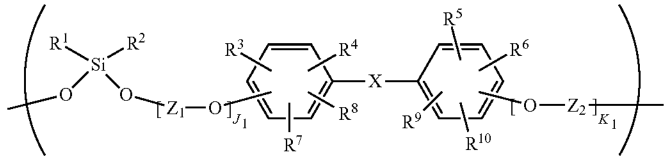

(II-2)

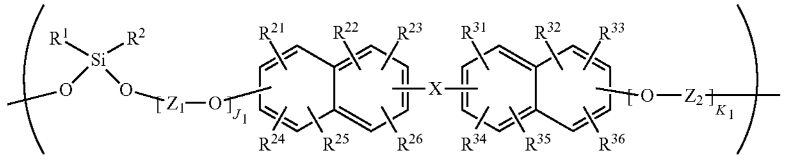

(II-3)

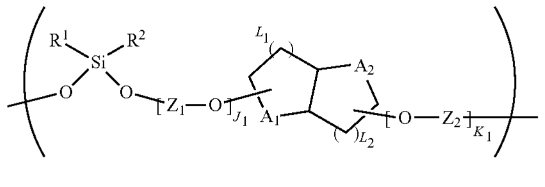

(II-4)

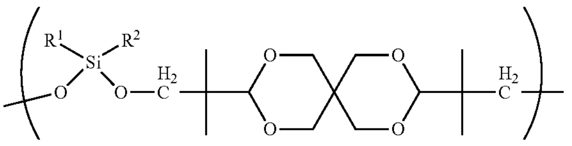

In general formulas (II-1) to (II-3), $J_1$ is each independently an integer of 0 to 5, and $K_1$ each independently represents an integer of 0 to 5. $J_1$ and $K_1$ each independently represent an integer of 0 or more and 5 or less, preferably an integer of 0 or more and 3 or less, more preferably an integer of 0 or more and 2 or less, and for example, 1 or 2.

In general formulas (II-1) to (II-3), $A_1$ and $A_2$ are each independently any of —O— and —$CH_2$—. Also, $L_1$ and $L_2$ are each independently an integer of 0 to 3. $L_1$ and $L_2$ are preferably 1 or 2.

In general formulas (II-1) to (II-4), the above-mentioned substituent is any of a halogen, a cyano group, an alkenyl group, an alkynyl group, and an alkoxy group; the number of carbon atoms in total in the alkenyl group and the alkynyl group is preferably 2 to 10, and more preferably 2 to 5; and the number of carbon atoms in total in the alkoxy group is preferably 1 to 10, and more preferably 1 to 5.

In general formulas (II-1) to (II-2), X is a single bond, or any of structural formulas represented by the following formulas (1) to (7).

(1)

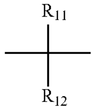

(2)

—S—

(3)

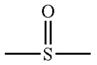

(4)

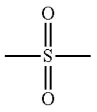

(5)

—O—

(6)

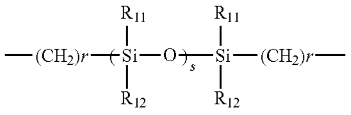

-continued (7)

$—(CH_2)r—$

In general formulas (1) to (7), $R_{11}$ and $R_{12}$ each independently represent a hydrogen atom, a halogen atom, an alkyl group having 1 to 20 carbon atoms in total and optionally having a substituent, or an aryl group having 6 to 30 carbon atoms in total and optionally having a substituent, or $R_{11}$ and $R_{12}$ are bonded to each other to form and are a carbocycle or heterocycle having 1 to 20 carbon atoms and optionally having a substituent. The number of carbon atoms in total in the alkyl group optionally having a substituent is preferably 1 to 10, more preferably 1 to 5, and still more preferably 1 to 5. The number of carbon atoms in total in the aryl group optionally having a substituent is preferably 6 to 20, more preferably 6 to 15, and still more preferably 6 to 12.

Also, in general formulas (1) to (7), the above-mentioned substituent is any of a halogen, a cyano group, an alkenyl group, an alkynyl group, and an alkoxy group.

r and s are each independently an integer of 0 to 5000, preferably 0 to 1000, and more preferably 0 to 500.

The constituent units (B-1) to (B-4) represented by general formulas (II-1) to (II-4), respectively, can be added in an arbitrary proportion relative to the constituent unit (A). However, it is preferable that the ratio between the number of moles (a) of the constituent unit (A) and the total molar ratio (b) of the constituent units (B-1) to (B-4) be a:b=0.1:99.9 to 100:0. The molar ratio of a:b is preferably 10:90 to 95:5, more preferably 20:80 to 90:10, still more preferably 30:70 to 80:20, and particularly preferably 30:70 to 70:30.

[(III) Polycarbonate Constituent Unit: Constituent Unit (C)]

The thermoplastic resin may be constituted solely by the above-mentioned constituent unit (A) and at least any of constituent units (B-1) to (B-4), for example, solely by the constituent units (A) and (B-1), but may also have another constituent unit.

For example, examples of the additional constituent unit for the thermoplastic resin include at least one of constituent units (C-1) to (C-4) represented by general formulas (III-1) to (III-4), respectively.

(III-1)

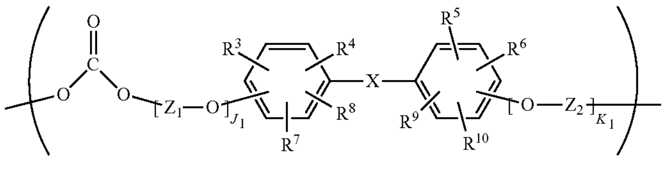

(III-2)

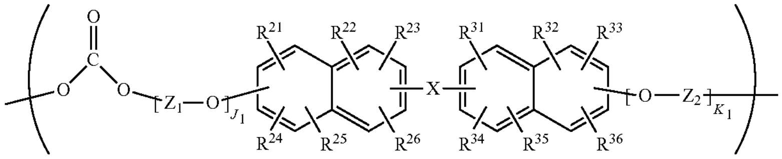

-continued (III-3)

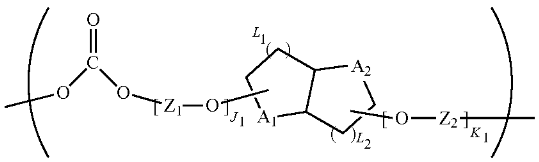

(III-4)

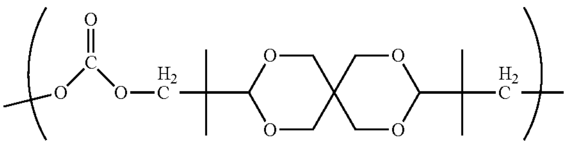

In general formulas (III-1) and (III-2), $R^3$ to $R^{10}$, $R^{21}$ to $R^{26}$, and $R^{31}$ to $R^{36}$ are each independently a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent.

When $R^3$ to $R^{10}$, $R^{21}$ to $R^{26}$, and $R^{31}$ to $R^{36}$ are each an alkyl group optionally having a substituent, the number of carbon atoms in total is preferably 1 to 10, the number of carbon atoms in total is more preferably 1 to 4, and the number of carbon atoms in total is particularly preferably 1 or 2.

When $R^3$ to $R^{10}$, $R^{21}$ to $R^{26}$, and $R^{31}$ to $R^{36}$ are each an alkenyl group optionally having a substituent, the number of carbon atoms in total is preferably 2 to 10, the number of carbon atoms in total is more preferably 2 to 6, and the number of carbon atoms in total is particularly preferably 2 to 4.

Also, when $R^3$ to $R^{10}$, $R^{21}$ to $R^{26}$, and $R^{31}$ to $R^{36}$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

In general formulas (III-1) to (III-4), the above-mentioned substituent is any of a halogen, a cyano group, an alkenyl group, an alkynyl group, and an alkoxy group; the number of carbon atoms in total in the alkenyl group and the alkynyl group is preferably 2 to 10, and more preferably 2 to 5; and the number of carbon atoms in total in the alkoxy group is preferably 1 to 10, and more preferably 1 to 5.

In general formulas (III-1) to (III-3), $Z_1$ and $Z_2$ are each independently an alkylene group having 1 to 5 carbon atoms and optionally having a substituent. $Z_1$ and $Z_2$ are preferably each an alkylene group having 1 to 3 carbon atoms, and more preferably each an alkylene group having 1 or 2 carbon atoms.

In general formulas (II-1) to (II-3), $J_1$ is each independently an integer of 0 to 5, and $K_1$ each independently represents an integer of 0 to 5. $J_1$ and $K_1$ each independently represent an integer of 0 or more and 5 or less, preferably an integer of 0 or more and 3 or less, more preferably an integer of 0 or more and 2 or less, and for example, 1 or 2.

In general formulas (II-1) to (II-3), $A_1$ and $A_2$ are each independently any of —O— and —$CH_2$—. Also, $L_1$ and $L_2$ are each independently an integer of 0 to 3. $L_1$ and $L_2$ are preferably 1 or 2.

In general formulas (III-1) to (III-2), X is a single bond, or any of structural formulas represented by the following formulas (1) to (7).

(1)

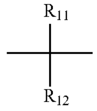

(2)

$$-S-$$

(3)

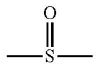

(4)

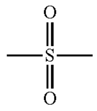

(5)

$$-O-$$

(6)

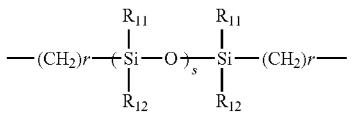

(7)

$$-(CH_2)r-$$

The above formulas (1) to (7) have the same meanings as formulas (1) to (7) in general formulas (II-1) to (II-2).

The constituent units (C-1) to (C-4) represented by general formulas (III-1) to (III-4), respectively, can be added in an arbitrary proportion relative to the constituent unit (A) or to the constituent unit (A) and the constituent unit (B).

However, it is preferable that the ratio between the total number of moles (a+b) of the constituent unit (A) and the constituent unit (B) and the total molar ratio c of the constituent units (C-1) to (C-4) be (a+b):c=0.1:99.9 to 100:0. The molar ratio of (a+b):c is preferably 10:90 to 95:5, more preferably 20:80 to 90:10, still more preferably 30:70 to 80:20, and particularly preferably 30:70 to 70:30.

Other Resins

The thermoplastic resin of the present invention may include resins other than the thermoplastic resin of the present invention, if necessary, as long as the desired various physical properties are not significantly impaired. Examples of such other resins may include thermoplastic polyester resin other than the thermoplastic resin of the present invention, such as polycarbonate resin, polyethylene terephthalate resin (PET resin), polytrimethylene terephthalate resin (PTT resin), and polybutylene terephthalate resin (PBT resin); styrene resin such as polystyrene resin (PS resin), high impact polystyrene resin (HIPS), acrylonitrile-styrene copolymer (AS resin), and methyl methacrylate-styrene copolymer (MS resin); core/shell type elastomer such as methyl methacrylate-acrylic rubber-styrene copolymer (MAS), elastomer such as polyester elastomer; polyolefin resin such as cyclic cycloolefin resin (COP resin) and cyclic cycloolefin (COP) copolymer resin; polyamide resin (PA resin); polyimide resin (PI resin); polyetherimide resin (PEI resin); polyurethane resin (PU resin); polyphenylene ether resin (PPE resin); polyphenylene sulfide resin (PPS resin); polysulfone resin (PSU resin); polymethacrylate resin (PMMA resin); and polycaprolactone.

[(IV) Properties of Thermoplastic Resin]

Next, the properties of the thermoplastic resin will be described.

The weight average molecular weight (Mw) of the thermoplastic resin is preferably 10,000 to 300,000, more preferably 10,000 to 200,000, and still more preferably 15,000 to 100,000, and for example, it is more preferably 20,000 to 80,000, still more preferably 30,000 to 70,000, and particularly preferably 40,000 to 65,000. As described above, the lower limit value of the weight average molecular weight of the thermoplastic resin is preferably 10,000, more preferably 15,000, and still more preferably 20,000.

When the thermoplastic resin is not used alone as it is, but mixed with other resins for use as a composition, for example, it may be good to significantly increase the above-mentioned proportion of the siloxane constituent unit (A). For example, a thermoplastic resin in which the above-mentioned proportion of the siloxane constituent unit (A) is 30% or more, 50% or more, or 70% or more and the Si content is high can realize a resin with excellent performance, such as high impact resistance and flowability, by being mixed with a polymer without Si or siloxane constituent units, as will be mentioned in detail later. In addition, as described above, when an application for which the proportion of the siloxane constituent unit is increased is preferable, the upper limit value of the above-mentioned proportion of the siloxane constituent unit (A) is not limited to 90%, and it may be, for example, 92%, 95%, 98%, or the like.

In the thermoplastic resin, the glass transition temperature (Tg) in accordance with JIS K 7121 is, for example, −30 to 130° C., preferably −20 to 120° C., and more preferably −10 to 100° C.

In the thermoplastic resin, a low molecular weight compound having a weight average molecular weight of 1,000 or less accounts for preferably 1% by weight or less, more preferably 0.5% by weight or less, and more preferably 0.2% by weight or less. Thermoplastic resins in which the low molecular weight compound having a weight average molecular weight of 1,000 or less is included in a large amount tend to foul metal molds (molds) with a trace amount of deposits (mold deposits) in a relatively early stage when they are continuously subjected to injection molding or the like for producing discs or complicated and thinner-walled products. In this regard, when the amount of the low molecular weight compound having a weight average molecular weight of 1,000 or less is 1% by mass or less in the thermoplastic resin, the fouling of metal molds can be effectively prevented.

Also, the lower limit value of the content rate of the low molecular weight compound having a weight average molecular weight of 1,000 or less in the thermoplastic resin is not particularly important, but it may be 0.001% by weight, 0.01% by weight, or 0.1% by weight, for example.

The content rate of the above-mentioned low molecular weight compound in the thermoplastic resin is a value calculated by summing the contents of several types of low molecular weight compounds, which are impurities, from the ratio of peak area of each component obtained by GPC analysis. That is, the proportion of the low molecular weight compound having a molecular weight (weight average molecular weight) of 1,000 or less in the thermoplastic resin is a value calculated from the ratio of the area of retention time of 20.5 min to 21.5 min/the area of 0 min to 21.5 min under specific GPC analysis conditions.

In the thermoplastic resin, the total content of cyclic bodies represented by the following formulas (5-1) to (5-3) is preferably 4.0% by weight or less, more preferably 3.0% by weight or less, still more preferably 2.0% by weight or less, and particularly preferably 1.0% by weight or less, based on the entire weight of the thermoplastic resin.

When the content of these cyclic dimers is in the above-mentioned range, there is no problem with the properties of the thermoplastic resin, especially when used in optical applications.

(5-1)

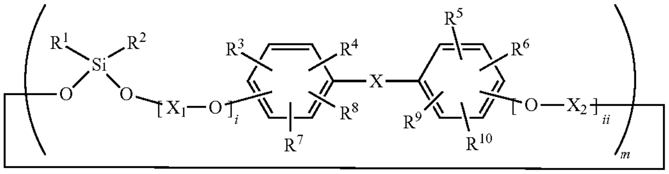

(5-2)

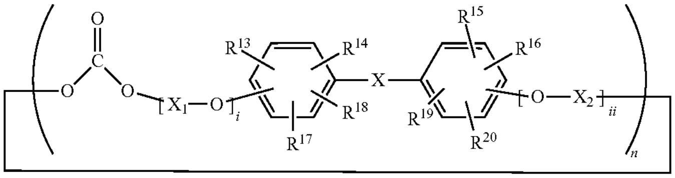

-continued (5-3)

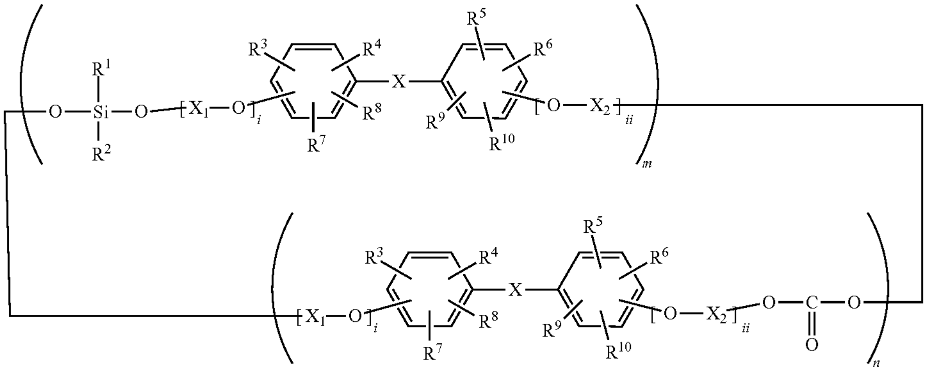

In formulas (5-1) to (5-3), m and n represent the total number of the constituent unit including the (—OSi($R_1R_2$)O—) moiety and the total number of the constituent unit including the (—OC(═O)O—) moiety in each cyclic body, respectively. That is, when the cyclic body of formula (5-1) includes a constituent unit other than the constituent unit including the (—OSi($R_1R_2$)O—) moiety, and when the cyclic body of formula (5-2) includes a constituent unit other than the constituent unit including the (—OC(═O)O—) moiety, m and n each represent the total number of the constituent unit represented by the formula in the cyclic body. In particular, formula (5-3) encompasses a cyclic body in which the constituent unit including the (—OSi($R_1R_2$)O—) moiety is mixed with the constituent unit including the (—OC(═O)O—) moiety, for example, they are arranged alternately, and in this case as well, m and n each represent the total number of the constituent unit represented by the formula in the cyclic body.

In formula (5-1), m represents an integer of 2 to 10, preferably 2 to 5, more preferably 2 or 3, and still more preferably 2.

m and n are each preferably 1 to 5, more preferably 1 or 2, and still more preferably 1.

Still as mentioned above, the arrangement of the constituent unit including the (—OSi($R_1R_2$)O—) moiety and the constituent unit including the (—OC(═O)O—) moiety is arbitrary in the cyclic body of formula (5-3).

In formulas (5-1) to (5-3), $X_1$ and $X_2$ are each independently an alkylene group having 1 to 5 carbon atoms and optionally having a substituent, preferably an alkylene group having 1 to 3 carbon atoms, and more preferably an alkylene group having 1 or 2 carbon atoms. In formulas (5-1) to (5-3), i and ii each independently represent an integer of 0 or more and 5 or less, preferably an integer of 0 or more and 3 or less, and more preferably 1 or 2.

Also, in formulas (5-1) to (5-3), $R^1$, $R^2$, $R^3$ to $R^{10}$, $R^{13}$ to $R^{20}$, and X are the same as $R^1$, $R^2$, $R^3$ to $R^{10}$, $R^{13}$ to $R^{20}$, and X in formulas (1-1) and (1-2), respectively.

In addition, specific examples of the compounds of formulas (5-1) to (5-3) include cyclic bodies of the following formulas (5-1') to (5-3'), respectively.

(5-1')

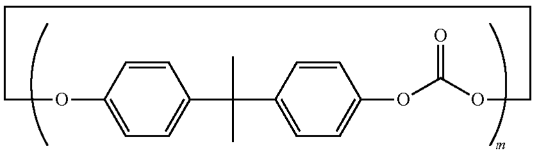

(5-2')

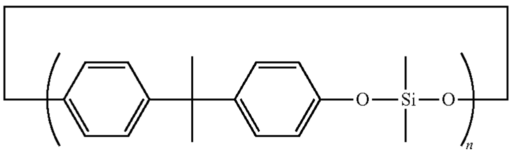

(5-3')

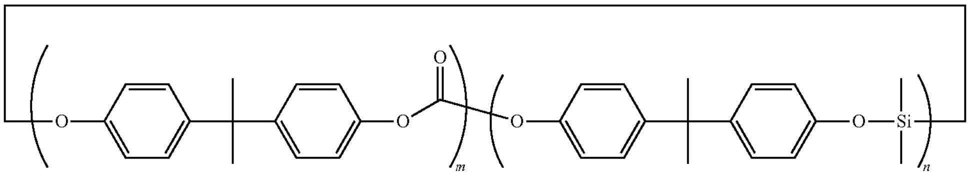

In formula (5-2), n represents an integer of 2 to 10, preferably 2 to 5, more preferably 2 or 3, and still more preferably 2.

In formula (5-3), the value of m, that is the total number of the constituent unit including the (—OSi($R_1R_2$)O—) moiety in the cyclic body, is 1 to 10, and the value of n, that is the total number of the constituent unit including the (—OC(═O)O—) moiety in the cyclic body, is 1 to 10. Then, In formula (5-1'), m=2 or 3, preferably m=2; in formula (5-2'), n=2 or 3, preferably n=2; and in formula (5-3'), m=any of 1 to 3, n=any of 1 to 3, preferably both 1 or 2, and more preferably both 1.

The thermoplastic resin preferably has a 1% mass reduction thermal decomposition temperature of 300° C. or higher, more preferably has a 1% mass reduction thermal decomposition temperature of 320° C. or higher, still more preferably has a 1% mass reduction thermal decomposition temperature of 330° C. or higher, and particularly preferably has a 1% mass reduction thermal decomposition temperature of 350° C. or higher.

In the thermoplastic resin, the mass reduction proportion at 500° C. as measured by the method whose details will be mentioned later is preferably 40% or less, more preferably 30% or less, still more preferably 25% or less, even more preferably 20% or less, and particularly preferably 17% or less.

That is, the mass retention rate (%) at 500° C. in the thermoplastic resin, which is the value of 100−"mass reduction proportion at 500° C. (%)," is preferably 60% or more, more preferably 70% or more, still more preferably 75% or more, even more preferably 80% or more, and particularly preferably 83% or more.

In the thermoplastic resin, the proportion of the total weight of silicon atoms (total Si content) based on the entire weight of the thermoplastic resin is preferably 0.1 to 20% by mass or 0.1 to 17% by mass, more preferably 1.0 to 15% by mass, still more preferably 2.0 to 12% by mass, and particularly preferably 3.0 to 10% by mass (for example, 3.1% by mass or more, or greater than 3.1% by mass and 9.8% by mass or less).

Next, the composition according to the present invention, that is, composition including the above-mentioned thermoplastic resin and the like, will be described in detail.

<2. Composition>

The composition of the present invention includes the above-mentioned thermoplastic resin, that is the thermoplastic resin described in the above <1. Thermoplastic resin> column, and a polycarbonate resin that does not fall under the above-mentioned thermoplastic resin. Examples of the polycarbonate resin that does not fall under the above-mentioned thermoplastic resin include a polycarbonate resin that is completely or substantially free of siloxane structures (constituent unit (A)).

The type of the polycarbonate resin that does not fall under the above-mentioned thermoplastic resin is not particularly limited as long as it includes a —[O—R—OCO]— unit including a carbonate ester bond in the molecular main chain (R is an aliphatic group, aromatic group, or one including both aliphatic and aromatic groups, and also has a linear or branched structure). Also, the polycarbonate resin that does not fall under the above-mentioned thermoplastic resin may include polyester carbonate. Then, as for the polyester carbonate as well, there is no particular limitation as long as it includes a —[O—R—OC]— unit including a carbonate ester bond in the molecular main chain (R is as mentioned above).

The weight average molecular weight of the polycarbonate resin that does not fall under the above-mentioned thermoplastic resin is preferably 10,000 to 100,000, more preferably 13,000 to 80,000, and still more preferably 15,000 to 60,000.

The composition of the present invention may include a resin other than the polycarbonate resin, preferably a thermoplastic resin. The type of the thermoplastic resin is not particularly limited, and in addition to the polycarbonate resin and polyester carbonate resin, examples thereof include various resins such as acrylic resin including polymethyl methacrylate (PMMA), polyethylene terephthalate (PET), triacetyl cellulose (TAC), polyethylene naphthalate (PEN), polyimide (PI), cycloolefin copolymer (COC), norbornene-containing resin, polyethersulfone, cellophane, and aromatic polyamide.

In the composition, the proportion of the total weight of silicon atoms (total Si content) based on the entire weight of the composition is preferably 0.1 to 20% by mass, more preferably 0.2 to 15% by mass, and particularly preferably 0.3 to 10% by mass. The proportion of the total Si content in the composition can be adjusted depending on the proportion that the siloxane constituent unit accounts for in the above-mentioned polycarbonate resin relative to all constituent units, or on the amount of resin mixed with the polycarbonate resin and the Si content.

For example, the Q value in the composition including the thermoplastic resin measured under conditions of 280° C. and 160 kgf, $Q_1$, is preferably a value of 120% or more (20% or more higher) compared to the Q value obtained by measuring only the polycarbonate resin included in that composition under the same conditions, $Q_2$. The value of $Q_1$ for the entire composition is more preferably 130% or more, still more preferably 140% or more, and particularly preferably 150% or more, such as 160% or more, compared to the value of $Q_2$ for the polycarbonate alone.

In addition, in the case of a composition including 5% by mass of the thermoplastic resin, the Q value measured under conditions of 280° C. and 160 kgf, $Q_1$, is preferably a value of 140% or more (40% or more higher) compared to the Q value obtained by measuring only the polycarbonate resin included in that composition under the same conditions, $Q_2$. The value of $Q_1$ for the entire composition is more preferably 150% or more, still more preferably 160% or more, and particularly preferably 170% or more, such as 180% or more, compared to the value of $Q_2$ for the polycarbonate alone.

By using a thermoplastic resin with a high Si content, a composition with excellent characteristics can be produced. By mixing a thermoplastic resin or the like with a Si content of, for example, 0.1% by mass or more with a resin that is substantially free of siloxane constituent units, preferably polycarbonate resin, it is possible to achieve both excellent impact resistance and flowability in the resulting composition, and it is also possible to further improve the heat resistance and flame retardancy.

Note that, in the composition including the thermoplastic resin, a phenolic compound that may be generated as a by-product of the polymerization reaction, as well as the silane-based compound, carbonate compound, and diol compound that remain without undergoing the reaction, may be included. The phenolic compound and diphenyl carbonate (DPC), which are impurities, may cause a decrease in strength when made into a molded body, and may also cause odor generation. Therefore, it is preferable for their contents to be kept as low as possible. For this reason, the contents of the phenolic compound, silane-based compound, carbonate compound, and diol compound may be reduced to the extent that they are not detected, but from the viewpoint of productivity, they may be contained in the composition to the extent that they do not impair the effects. In addition, when remaining monomers are contained in a predetermined amount, such as 1 to 1000 ppm by weight, preferably 10 to 900 ppm, and more preferably 20 to 800 ppm, based on the entire weight of the composition, the effect of improved flowability during molding can be obtained and good plasticity can be achieved when the resin is melted.

Next, the molded body according to the present invention, which includes the thermoplastic resin, will be described.

<3. Molded Body>

The molded body according to the present invention is obtained by molding the above-mentioned thermoplastic resin, the composition including the thermoplastic resin, or the like. The molding method for the molded body is not particularly limited, and examples of the molded body include an injection molded product, a press molded product, a blow molded product, an extrusion molded product, a vacuum molded product, and a pressure molded product.

Also, the optical lens, molded body, according to the present invention is obtained by molding the thermoplastic resin of the present invention, the composition including the thermoplastic resin, or the like. The thermoplastic resin of the present invention is suited for optical applications, and the optical lens of the present invention has a refractive index, Abbe number, and the like in a range suited for use as a lens.

Molded Body Other than Lens

There is no restriction on the shape, pattern, color, dimensions, and other properties of the molded body obtained using the thermoplastic resin, and they can be arbitrarily set depending on its application. Specific examples of the molded body may include electrical and electronic equipment, office automation (OA) equipment, information terminal equipment, machine parts, home appliances, vehicle parts, construction members, various containers, leisure goods and sundries, parts of lighting equipment and the like, parts of various household electrical products and the like, housings, containers, covers, storage parts, and cases of electrical appliances, and covers and cases of lighting appliances. Examples of the electrical and electronic equipment may include personal computers, game machines, television receivers, display devices such as liquid crystal displays and plasma displays, printers, copiers, scanners, fax machines, electronic notebooks and personal digital assistants (PDAs), electronic desk calculators, electronic dictionaries, cameras, video cameras, cellular phones, battery packs, recording medium drives and reading devices, mice, numeric keypads, CD (Compact Disc) players, MD (MiniDisc) players, and portable radio and audio players. Examples of the molded product may also include electric signboards, liquid crystal backlights, lighting displays, traffic signs, sign boards, screens, automotive parts (in-vehicle parts) such as reflecting plates and meter parts, toys, and decorative items.

The thermoplastic resin of the present invention has excellent impact resistance, high flowability when melted, and can be a molded body having a microstructure, and therefore, it can be suitably used as in-vehicle electrical and electronic parts, machine parts, and vehicle parts. Examples of such parts include automotive interior panels, automotive lamp lenses, automotive inner lenses, automotive lens protection covers, and automotive light guides.

Method for Producing Molded Body

The method for producing the molded body of the present invention is not particularly limited, and any molding method generally employed for resins such as polycarbonate resin can be employed. Examples thereof may include injection molding method, ultra high-speed injection molding method, injection compression molding method, two-color molding method, hollow molding method such as gas-assisted molding, molding method using insulated metal mold, molding method using rapid heating metal mold, foam molding (including supercritical fluid), insert molding, IMC (in-mold coating molding) molding method, extrusion molding method, sheet molding method, thermoforming method, rotational molding method, laminate molding method, and press molding method. Also, the molding method using the hot runner system can be used. Also, the molding method using the hot runner system can be used for producing the molded body.

<4. Method for Producing Thermoplastic Resin>

The method for producing the thermoplastic resin of the present invention, which has the above-mentioned constitution and properties, has a polymerization step of polymerizing an oxysilane compound and an aromatic diol compound in the presence of a catalyst.

Schematically illustrating the reaction in the polymerization step, it is as follows. For example, as shown in the following formula (A) or (B), the thermoplastic resin is obtained by allowing a diol compound such as hydroquinone (HQ) or 4,4'-biphenyldiol (BP) to react with a diaryloxysilane compound having two methyl groups and two phenoxy groups ($Si(CH_3)_2(OPh)_2$), which is one example of the silane-based compound.

(A)

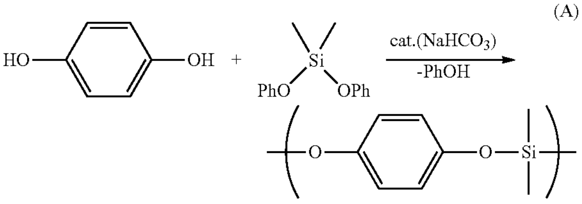

(B)

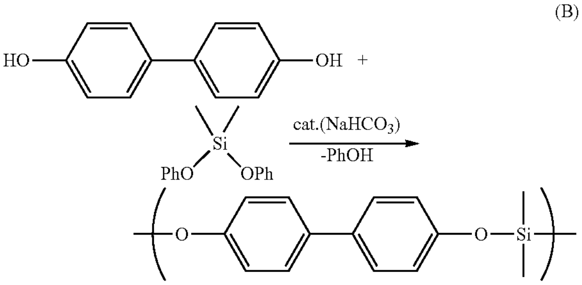

In these polymerization reactions, an alcohol derived from the silane-based compound, such as an aryl alcohol including phenol (PhOH) shown in formulas (A) and (B), may be generated as a by-product. Therefore, in the polymerization step, the polymerization reaction is advanced while the mixture of each of the above-mentioned components is melted and the byproduct alcohol, such as an aryl alcohol including phenol and an alkyl alcohol, is removed under reduced pressure.

The details of the method for producing the thermoplastic resin, starting with raw material substances such as the oxysilane compound and the diol compound, are as follows.

The oxysilane compound used in production of the thermoplastic resin can be selected from a diaryloxysilane compound and a dialkoxysilane compound.

Examples of the diaryloxysilane compound include a dialkyldiaryloxysilane, a diaryldiaryloxysilane, and a monoalkylmonoaryldiaryloxysilane.

Also, examples of the dialkoxysilane compound include a dialkyldialkoxysilane, a diaryldialkoxysilane, and a monoalkylmonoaryldialkoxysilane.

These oxysilane compounds are specifically as follows.

[I. Oxysilane Compound]

The oxysilane compound used in the polymerization step is used for forming the siloxane constituent unit (constituent unit (A)) in the thermoplastic resin as shown in the above formula (A), for example. Although the oxysilane compound is not particularly limited as long as it is capable of forming the siloxane constituent unit in the main chain of the thermoplastic resin, it is selected from a specific diaryloxysilane compound, a specific dialkoxysilane compound, and a specific silicon compound (siloxane compound).

In the polymerization step, for example, a silane-based compound is used that includes any of at least any one of diaryloxysilane compounds, at least any one of dialkoxysilane compounds, and at least one of silicon compounds, the details of which will be mentioned later. The silane-based compound to be used may be a combination of a plurality of diaryloxysilane compounds, a combination of a plurality of dialkoxysilane compounds, a combination of a plurality of silicon compounds, a mixture of a diaryloxysilane compound and a silicon compound, a mixture of a dialkoxysilane compound and a silicon compound, or a mixture of a diaryloxysilane compound and a dialkoxysilane compound. Hereinafter, the diaryloxysilane compound will be described.

(I-1) Diaryloxysilane Compound

Examples of the diaryloxysilane compound include a dialkyldiaryloxysilane, a diaryldiaryloxysilane, and a monoalkylmonoaryldiaryloxysilane. That is, any one of these or a plurality of them may be used as the silane-based compound in the polymerization step.

When the diaryloxysilane compound is represented by the general formula $Si(R^aR^b)(OAr)_2$, $R^a$ and $R^b$ are each independently selected from an alkyl group and an aryl group. It is preferable that $R^a$ and $R^b$ be each independently an alkyl group having 1 to 20 carbon atoms in total and optionally having a substituent or an aryl group having 6 to 30 carbon atoms in total and optionally having a substituent. More preferably, when $R^a$ and $R^b$ are each an alkyl group optionally having a substituent, the number of carbon atoms in total is preferably 1 to 10, the number of carbon atoms in total is more preferably 1 to 6, and the number of carbon atoms in total is particularly preferably 1 or 2.

Also, when $R^a$ and $R^b$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^a$ and $R^b$ in formula (1) include a methyl group, a phenyl group, a vinyl group, and a propyl group.

Note that, as is obvious from the above formula (A), the aryloxy group (OAr group) of the silane compound is not introduced into the polymer chain of the polycarbonate copolymer, but generates a by-product (ArOH), such as phenol. For this reason, there is no limitation on the type of the aryloxy group. However, in order to remove the by-product in the polymerization step from the reaction system as easily as possible, it is preferable that the aryloxy group have low polarity and a low molecular weight, and it is, for example, a phenoxy group.

Specific examples of the dialkyldiaryloxysilane include dimethyldiphenoxysilane, methylethyldiphenoxysilane, and diethyldiphenoxysilane, and specific examples of the diaryldiaryloxysilane include diphenyldiphenoxysilane.

Also, specific examples of the monoalkylmonoaryldiaryloxysilane include methylphenylphenoxysilane.

[II. Dialkoxysilane Compound]

Examples of the dialkoxysilane compound include a dialkyldialkoxysilane, a diaryldialkoxysilane, and a monoalkylmonoaryldialkoxysilane. That is, any one of these or a plurality of them may be used as the silane-based compound in the polymerization step.

When the dialkoxysilane compound is represented by the general formula $Si(R^aR^b)(OR^C)_2$, $R^a$ and $R^b$ are each independently selected from an alkyl group and an aryl group, which are the same as for $R^a$ and $R^b$ described in the (A-1) Diaryloxysilane compound column.

Note that, as is obvious from the above formula (A), the alkoxy group ($OR^c$ group) of the silane compound is not introduced into the polymer chain of the polycarbonate copolymer, but generates a by-product, such as methanol (MeOH). For this reason, there is no particular limitation on the type of the alkoxy group. However, in order to remove the by-product in the polymerization step from the reaction system as easily as possible, the alkoxy group ($OR^c$ group) is, for example, a methoxy group.

Specific examples of the dialkyldialkoxysilane include dimethyldimethoxysilane, methylethyldimethoxysilane, and diethyldimethoxysilane, and specific examples of the diaryldialkoxysilane include diphenyldimethoxysilane. Also, specific examples of the monoalkylmonoaryldialkoxysilane include methylphenyldimethoxysilane.

[III. Silicon Compound (Siloxane Compound)]

Hereinafter, the silicon compound will be described. Examples of the silicon compound include a specific cyclic siloxane compound and a linear siloxane compound. That is, any of these may be used as the silane-based compound in the polymerization step.

(III-1) Cyclic Siloxane Compound

Examples of the siloxane compound used in the polymerization step include a cyclic siloxane compound represented by the following formula (5).

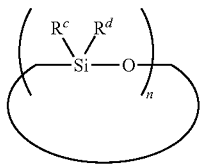

(5)

In formula (5), $R^c$ and $R^d$ each independently represent an alkyl group, alkenyl group, or aryl group optionally having a substituent. It is preferable that $R^c$ and $R^d$ in formula (5) be each an alkyl group having 1 to 20 carbon atoms in total and optionally having a substituent or an aryl group having 6 to 30 carbon atoms in total and optionally having a substituent.

When $R^c$ and $R^d$ are each an alkyl group optionally having a substituent, the number of carbon atoms in total is preferably 1 to 10, the number of carbon atoms in total is more preferably 1 to 6, and the number of carbon atoms in total is particularly preferably 1 or 2.

Also, when $R^c$ and $R^d$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^c$ and $R^d$ in formula (5) include a methyl group, a phenyl group, a vinyl group, and a propyl group.

The cyclic siloxane compound has a siloxane structure, and examples of the siloxane structure include a —$OSi(R^cR^d)O$— structure having the above-mentioned $R^c$ group and $R^d$ group. In the polymerization step, such a —$OSi(R^cR^d)O$— moiety of the cyclic siloxane compound is introduced into the polycarbonate copolymer, the details of which will be mentioned later.

In formula (5), n represents an integer of 3 or more and 30 or less. The value of n in formula (5) is preferably 3 or more and 15 or less, more preferably 3 or more and 10 or less, still more preferably 3 or more and 8 or less, and particularly preferably 3 or more and 5 or less.

The molecular weight of the cyclic siloxane compound represented by formula (5) is preferably 2,000 or less, more preferably 1,600 or less, still more preferably 1,200 or less, and particularly preferably 1,000 or less. Also, the molecular weight of the cyclic siloxane compound represented by formula (5) is, for example, 100 or more, preferably 150 or more, and more preferably 200 or more.

(III-2) Linear Siloxane Compound

Examples of the siloxane compound used in the polymerization step also include a linear siloxane compound represented by the following formula (6).

(6)

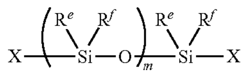

In formula (6), $R^e$ and $R^f$ each independently represent an alkyl group or aryl group optionally having a substituent. It is preferable that $R^e$ and $R^f$ in formula (6) be each an alkyl group having 1 to 20 carbon atoms in total and optionally having a substituent or an aryl group having 6 to 30 carbon atoms in total and optionally having a substituent.

When $R^e$ and $R^f$ are each an alkyl group optionally having a substituent, the number of carbon atoms in total is preferably 1 to 10, the number of carbon atoms in total is more preferably 1 to 8, and the number of carbon atoms in total is particularly preferably 1 or 2.

Also, when $R^e$ and $R^f$ are each an aryl group optionally having a substituent, the number of carbon atoms in total is preferably 6 to 20, the number of carbon atoms in total is more preferably 6 to 12, and the number of carbon atoms in total is particularly preferably 6 to 8.

Examples of the above-mentioned substituent include a hydroxyl group, a halogen, an amino group, a vinyl group, a carboxyl group, a cyano group, a (meth)acryloxy group, a glycidyloxy group, and a mercapto group.

Preferred specific examples of $R^e$ and $R^f$ in formula (6) include a methyl group, a phenyl group, a vinyl group, and a propyl group.

The linear siloxane compound also has a siloxane structure, and examples of the siloxane structure include a —OSi($R^eR^f$)O— structure having the above-mentioned $R^e$ group and $R^f$ group. In the polymerization step, the —OSi($R^eR^f$)O— moiety of the linear siloxane compound is introduced into the polycarbonate copolymer, the details of which will be mentioned later.

In formula (6), m represents an integer of 2 or more and 10,000 or less. The value of m in formula (6) is preferably 10 or more and 7,000 or less, more preferably 100 or more and 2,000 or less, and still more preferably 200 or more and 500 or less.

In formula (6), X each independently represents a hydrogen atom, a hydroxyl group, an alkoxy group having 1 to 10 carbon atoms in total and optionally having a substituent, a hydrocarbon group optionally having a substituent, optionally having an oxygen atom or nitrogen atom, and having 1 to 10 carbon atoms in total, or an amino group optionally having a substituent. Preferably, X is each independently any of a hydrogen atom, a hydroxyl group, an alkoxy group having 1 to 10 carbon atoms in total and optionally having a substituent, and an alkyl group optionally having a substituent, optionally having an oxygen atom or nitrogen atom, and having 1 to 10 carbon atoms in total. More preferably, it is a hydroxyl group or an alkyl group having 1 to 10 carbon atoms in total and optionally having a substituent, and still more preferably, it is a hydroxyl group or an alkyl group having 1 to 5 carbon atoms in total.

Examples of the above-mentioned substituent for X include a hydroxyl group, a halogen, an amino group, a vinyl group, a carboxyl group, a cyano group, a (meth)acryloxy group, a glycidyloxy group, and a mercapto group.

The molecular weight of the linear siloxane compound represented by formula (6) is preferably 60,000 or less, more preferably 56,000 or less, still more preferably 50,000 or less, and particularly preferably 45,000 or less. Also, the molecular weight of the linear siloxane compound represented by formula (6) is, for example, 1,000 or more, preferably 5,000 or more, and more preferably 10,000 or more.

Among the above-mentioned cyclic siloxane compound of formula (5) and the linear siloxane compound represented by the following formula (6), only a single siloxane compound may be used, or two or more types of siloxane compounds may be used as a mixture. Also, the siloxane compound of formula (5) or formula (6) may be used in combination with the above-mentioned (A) diaryloxysilane compound.

Note that the above-mentioned silane-based compound can be synthesized by known methods, or those commercially available may be used.

[IV. Diol Compound]

In the polymerization step for the thermoplastic resin, a diol compound represented by the following general formula (IV) is used.

(IV)

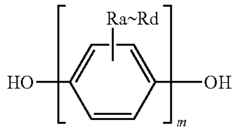

$R_a$ to $R_d$ and m in general formula (IV) have the same meanings as $R_a$ to $R_d$ and m in general formula (I), respectively.

The aromatic diol compound is used for constituting the main chain of the polycarbonate copolymer, as shown in the above formulas (A) and (B), which relate to the outline of the polymerization reaction.

In addition to the above-mentioned hydroquinone (HQ), 4,4'-biphenyldiol (BP), and the like, examples of the aromatic diol compound used in the polymerization step include the following. Examples thereof include 2-methyl-1,4-benzenediol, 2,3-dimethyl-1,4-benzenediol, 2,6-dimethyl-1,4-benzenediol, 2,3,5-trimethyl-1,4-benzenediol, 2,3,5,6-tetramethyl-1,4-benzenediol, [1,1'-biphenyl]-4,4'-diol, 3-methyl-[1,1'-biphenyl]-4,4'-diol, 3,3'-dimethyl-[1,1'-biphenyl]-4,4'-diol, 3,5-dimethyl-[1,1'-biphenyl]-4,4'-diol, 3,3",5,5"-tetramethyl-[1,1'-biphenyl]-4,4'-diol, 2,2',3,3',5,5'-hexamethyl-[1,1'-biphenyl]-4,4'-diol, [1,1':4',1"-terphenyl]-4,4"-diol, 3-methyl-[1,1':4',1"-terphenyl]-4,4"-diol, 3,5-dimethyl-[1,1':4',1"-terphenyl]-4,4"-diol, 3,3"-dimethyl-[1,1':4',1"-terphenyl]-4,4"-diol, and 3,3",5,5"-tetramethyl-[1,1':4',1"-terphenyl]-4,4"-diol.

Among these, hydroquinone (HQ) and 4,4'-biphenyldiol (BP) are preferable as the aromatic diol compound.

In the polymerization step, in addition to the above-mentioned aromatic diol, an alicyclic diol compound or the like may be further used. In the polymerization step, as the diol compound, it is preferable to use 50 mol % or more of the aromatic diol represented by the above-mentioned formula (IV), it is more preferable to use 70 mol % or more of the aromatic diol represented by formula (IV), it is still more preferable to use 90 mol % or more, and it is particularly preferable to use 95 mol % or more of the aromatic diol.

In the polymerization step, the above-mentioned oxysilane compound and the above-mentioned diol compound are polymerized using a catalyst under reduced pressure in a molten state while the resulting aryl alcohol and/or alkyl alcohol is removed. By doing so, a thermoplastic resin including the constituent unit (A) represented by the above-mentioned general formula (I), for example, is obtained.

[V. Catalyst]

The catalyst to be used in the polymerization step is as follows.

(V-1) Alkali Metal-Based Catalyst

As the catalyst used in the polymerization step, a catalyst including a basic compound is preferable. Examples of the basic compound catalyst include those including alkali metal compounds, alkaline earth metal compounds, and the like, and examples of such compounds include organic acid salts, inorganic salts such as carbonates, oxides, hydroxides, hydrides, and alkoxides of alkali metal compounds, alkaline earth metal compounds, and the like. Alternatively, as the basic compound catalyst, quaternary ammonium hydroxides and their salts, amines, and the like are used. These compounds can be used alone, or multiple types of them can be used in combination.

Among the above-mentioned basic compound catalysts, it is more preferable that the catalyst include an alkali metal carbonate or an alkali metal hydroxide.

More preferred specific examples of the catalyst include those including cesium carbonate, potassium carbonate, sodium carbonate, sodium bicarbonate, cesium hydroxide, potassium hydroxide, and sodium hydroxide.

Note that the above-mentioned catalyst can be prepared by known methods, or those commercially available may be used.

(V-2) Phosphorus-Based Catalyst

As the catalyst used in the polymerization step, a catalyst including a phosphorus compound is also suitably used.

It is preferable that the phosphorus-based catalyst include at least a compound represented by the following general formula (8).

$$(PRe_4)^+(Xc)^- \quad (8)$$

In general formula (8), Re each independently represents an alkyl group, an aryl group, or an alkylaryl group, and a plurality of Re are optionally bonded to each other to form a ring structure. It is preferably an aryl group having 6 to 16 carbon atoms.

In general formula (8), Xc is a hydroxyl group, a halogen atom, an alkyloxy group, an aryloxy group, an alkylcarbonyloxy group, an arylcarbonyloxy group, $HCO_3$, or $BRf_4$ (Rf is each independently a hydrogen atom, an alkyl group, or an aryl group), and it is preferably an aryloxy group including an aryl group having 6 to 16 carbon atoms, $BRf_4$ including an aryl group having 6 to 16 carbon atoms as $Rf_4$, or the like. Note that these aryl groups having 6 to 16 carbon atoms are aryl groups preferably having 6 to 12 carbon atoms, and more preferably having 6 to 8 carbon atoms.

Specific examples of the phosphorus-based catalyst include biphenyltriphenylphosphonium hydroxide, biphenyltriphenylphosphonium tetraphenylborate, biphenyltriphenylphosphonium phenoxide, biphenyltriphenylphosphonium chloride, tetraphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenylborate, methoxyphenyltriphenylphosphonium tetraphenylborate, phenoxyphenyltriphenylphosphonium tetraphenylborate, naphthylphenyltriphenylphosphonium tetraphenylborate, tetraphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, methoxyphenyltriphenylphosphonium chloride, phenoxyphenyltriphenylphosphonium chloride, and naphthylphenyltriphenylphosphonium chloride.

Among these, in particular, tetraphenylphosphonium phenoxide, tetraphenylphosphonium tetraphenylborate, and the like are preferable.

[VI. Reaction Conditions of Polymerization Step]

In the polymerization step, the mixture of each of the above-mentioned components is melted, and while in a molten state, the by-product aryl alcohol or alkyl alcohol is removed under reduced pressure. By setting the reaction conditions in this way, the polymerization reaction can be proceeded efficiently.

In the polymerization step, it is preferable to gradually decrease the reaction pressure and then adjust it to a specific level. That is, in the polymerization step, it is preferable to maintain the system at normal pressure without pressure reduction or with little pressure reduction for a certain period of time, and then reduce the pressure in the system to further proceed the polymerization reaction. Specifically, it is preferable to set the pressure to a value of 24,000 Pa or more, then decrease it in stages to less than 100 Pa, and advance the polymerization reaction under the decreased pressure.

For example, in the polymerization step, it is preferable to gradually decrease the reaction pressure from the initial atmospheric pressure to less than 100 Pa, such as 27,000 Pa, 24,000 Pa, 20,000 Pa, 16,000 Pa, 8,000 Pa, 4,000 Pa, 2,000 Pa, 400 Pa, and less than 100 Pa. As described above, the pressure reduction step, in which the pressure in the reaction system is reduced in stages and the pressure reduction degree is improved in the middle of the step, can efficiently remove the by-product alcohol while suppressing the distillation of the raw materials, which is preferable.

Also, it is preferable to adjust the reaction pressure to less than 100 Pa, with or without the decrease in stages.

The time of the polymerization step can be determined as appropriate, taking into consideration conditions such as the type of target polycarbonate copolymer, pressure, and temperature. For example, the total time spent for the polymerization step is 5 to 10 hours or less. In more detail, the reaction time before pressure reduction in the reaction system is 0.5 to 3 hours, preferably 1 to 2 hours, and the reaction time after pressure reduction is 1 to 5 hours, preferably 2 to 4 hours.

In the polymerization step, it is preferable that the temperature in the above-mentioned polymerization reaction be in the range of 150 to 300° C. More preferably, the temperature of the polymerization reaction is 180 to 290° C., still more preferably 200 to 280° C.

In addition, each component of the above-mentioned silane-based compound and aromatic diol compound have good miscibility with each other, and the polycarbonate copolymer can be produced without using any solvent in the polymerization step. For this reason, the polymerization step can be simplified.

In the polymerization step, it is preferable that the ratio of the molar amount of the catalyst to the molar amount of the aromatic diol compound (molar ratio: that is, the value of the molar amount of the catalyst/the molar amount of the aromatic diol compound) be $1.0\times10^{-7}$ to $1.0\times10^{-2}$ (mol/mol: 0.1 to 10000 μmol/mol or $1.0\times10^{-4}$ to 10 mmol/mol). The above molar ratio is more preferably $1.0\times10^{-7}$ to $2.0\times10^{-5}$ mol/mol (or 0.5 to 20 μmol/mol).

Thermoplastic Resin

In the polymerization step, the molar ratio of the aromatic diol compound (diol compound) to the silane-based compound (oxysilane compound) (that is, the value of the number of moles of the silane-based compound/the number of moles of the aromatic diol compound) is, for example, 0.8 to 1.3, preferably 0.9 or more and 1.2 or less or 0.9 or more and 1.25 or less, and more preferably 0.95 or more and 1.2 or less.

Also, in the polymerization step, the molar ratio of the aromatic diol compound (diol compound) to the total number of moles of the diaryl carbonate and silane-based compound (oxysilane compound) (that is, the value of (the total number of moles of the diaryl carbonate and silane-based compound)/the number of moles of the aromatic diol compound) is preferably 0.9 or more and 1.2 or less, and more preferably, 0.95 or more and 1.15 or less.

[VII. Molecular Weight Measurement Step and Additional Polymerization Step]

In the method for producing the thermoplastic resin, a molecular weight measurement step may be performed to measure the molecular weight, such as weight average molecular weight, of the thermoplastic resin obtained in the polymerization step. The method for measuring the molecular weight is as mentioned later.

In addition, when a specific target value is set for the molecular weight, such as weight average molecular weight (Mw), of the thermoplastic resin produced by the polymerization step, and the measured value of the molecular weight is out of the target value range, especially when the measured value is lower than the target value, an additional polymerization step may be performed to repolymerize the thermoplastic resin.

Specific examples of the target value for the molecular weight of the thermoplastic resin include the above-mentioned preferred ranges for the weight average molecular weight (Mw), such as 10,000 to 300,000, 10,000 to 200,000, 15,000 to 100,000, 20,000 to 80,000, 30,000 to 70,000, and 40,000 to 65,000. Also, from the viewpoint of preventing insufficient polymerization, only the lower limit value of the weight average molecular weight may be set as the target value, and examples of the target value for the lower limit value include 10,000 or more, 15,000 or more, 20,000 or more, 25,000 or more, 30,000 or more, and 35,000 or more.

The time of the additional polymerization step can be determined as appropriate, taking into consideration various conditions, in the same manner as in the polymerization step. For example, the time of the additional polymerization step is 20 minutes to 5 hours, 30 minutes to 4 hours, 1 to 3 hours, or 1.5 to 2.5 hours.

Also, it is preferable that the temperature of the polymerization reaction in the additional polymerization step be in the range of 150 to 300° C. More preferably, the temperature of the polymerization reaction is 180 to 290° C., still more preferably 200 to 280° C., such as 220 to 260° C.

(Secondary Component)

Quencher

In the thermoplastic resin of the present invention, the catalyst may be removed or deactivated after the polymerization reaction for production is terminated in order to retain thermal stability and hydrolytic stability. For example, a method for deactivating the catalyst by addition of a known acidic substance can be suitably performed. As the acidic substance, specifically, esters such as butyl benzoate, aromatic sulfonic acids such as p-toluenesulfonic acid; aromatic sulfonate esters such as butyl p-toluenesulfonate and hexyl p-toluenesulfonate; phosphoric acids such as phosphorous acid, phosphoric acid, and phosphonic acid; phosphite esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphate esters such as triphenyl phosphate, diphenyl phosphate, monophenyl phosphate, dibutyl phosphate, dioctyl phosphate, and monooctyl phosphate; phosphonic acids such as diphenylphosphonic acid, dioctylphosphonic acid, and dibutylphosphonic acid; phosphonate esters such as diethyl phenylphosphonate; phosphines such as triphenylphosphine and bis(diphenylphosphino)ethane; boric acids such as boric acid and phenylboric acid; aromatic sulfonate salts such as tetrabutylphosphonium dodecylbenzenesulfonate salt; organic halides such as stearoyl chloride, benzoyl chloride, and p-toluenesulfonyl chloride; alkylsulfuric acids such as dimethylsulfuric acid; organic halides such as benzyl chloride; and the like are suitably used. These quenchers may be used in a molar amount of 0.001 to 50 times, preferably 0.01 to 30 times, with respect to the amount of the catalyst, for example.

Additive

<Stabilizer>

To the thermoplastic resin and the molded body of the present invention, a stabilizer may be added. As the stabilizer, a thermal stabilizer and an antioxidant are exemplified. When compounded, the proportion of the stabilizer to be added is preferably 0.001 parts by mass or more, more preferably 0.01 parts by mass or more, and still more preferably 0.02 parts by mass or more, and also preferably 2 parts by mass or less, more preferably 1.4 parts by mass or less, and still more preferably 1.0 parts by mass or less, with respect to 100 parts by mass of the thermoplastic resin. Only one type of stabilizer may be included, or two or more types of stabilizers may be included. When two or more types are included, it is preferable that the total amount be in the above range.

<<Thermal Stabilizer>>

Examples of the thermal stabilizer may include a phenolic thermal stabilizer, a phosphorus-based thermal stabilizer, and a sulfur-based thermal stabilizer. Specific examples thereof may include oxoacids of phosphorus such as phosphoric acid, phosphonic acid, phosphorous acid, phosphinic acid, and polyphosphoric acid; acid pyrophosphate metal salts such as sodium acid pyrophosphate, potassium acid pyrophosphate, and calcium acid pyrophosphate; phosphate salts of Group 1 or Group 10 metals such as potassium phosphate, sodium phosphate, cesium phosphate, and zinc phosphate; and organic phosphate compounds, organic phosphite compounds, and organic phosphonite compounds.

Examples thereof may also include at least one selected from the group of (a) phosphite ester compound in which at least one ester in the molecule is esterified with phenol and/or phenol having at least one alkyl group having 1 to 25 carbon atoms, (b) phosphorous acid, and (c) tetrakis(2,4-di-tert-butylphenyl)-4,4'-biphenylene-di-phosphonite. Specific examples of the (a) phosphite ester compound may include trioctyl phosphite, trioctadecyl phosphite, tridecyl phosphite, trilauryl phosphite, tristearyl phosphite, triphenyl phosphite, tris(monononylphenyl) phosphite, tris(monononyl/dinonyl-phenyl) phosphite, trisnonylphenyl phosphite, tris(octylphenyl) phosphite, tris(2,4-di-tert-butylphenyl) phosphite, trinonyl phosphite, didecylmonophenyl phosphite, dioctylmonophenyl phosphite, diisopropylmonophenyl phosphite, monobutyldiphenyl phosphite, monodecyldiphenyl phosphite, bis(2,4-di-tert-butylphenyl) pentaerythritol phosphite, bis(2,6-di-tert-butyl-4-methylphenyl)pentaerythritol phosphite, monooctyldiphenyl phosphite, distearylpentaerythritol diphosphite, tricyclohexyl phosphite, diphenylpentaerythritol diphosphite, bis(2,6-di-tert-butyl-4-methylphenyl)pentaerythritol diphosphite, 2,2-methylene bis(4,6-di-tert-butylphenyl)octyl phosphite, bis(nonylphenyl) pentaerythritol diphosphite, bis(2,4-di-tert-butylphenyl) pentaerythritol diphosphite, and bis(2,6-di-tert-butyl-4-ethylphenyl)pentaerythritol diphosphite. They may be used alone, or two or more types may be mixed for use.

Examples of the organic phosphite compound may include "ADK STAB 1178 (trade name, hereinafter the same)," "ADK STAB 2112," and "ADK STAB HP-10" manufactured by ADEKA CORPORATION, "JP-351," "JP-360," and "JP-3CP" manufactured by Johoku Chemical Co., Ltd., and "Irgafos 168" manufactured by BASF SE.

Also, examples of the phosphate ester may include trimethyl phosphate, triethyl phosphate, tributyl phosphate, trioctyl phosphate, triphenyl phosphate, tricresyl phosphate, tris(nonylphenyl) phosphate, and 2-ethylphenyldiphenyl phosphate.

When compounded, the proportion of the thermal stabilizer to be added is preferably 0.001 parts by mass or more in total, more preferably 0.01 parts by mass or more, and still more preferably 0.03 parts by mass or more, and also preferably 1 part by mass or less, more preferably 0.7 parts by mass or less, and still more preferably 0.5 parts by mass or less, with respect to 100 parts by mass of the thermoplastic resin.

Only one type of thermal stabilizer may be included, or two or more types of thermal stabilizers may be included. When two or more types are included, it is preferable that the total amount be in the above range.

<<Antioxidant>>

Examples of the antioxidant may include a phenolic antioxidant, a hindered phenolic antioxidant, a bisphenolic antioxidant, and a polyphenolic antioxidant. Specific examples thereof may include 2,6-di-tert-butyl-4-methylphenol, tris(3,5-di-tert-butyl-4-hydroxybenzyl) isocyanurate, n-octadecyl-3-(3',5'-di-tert-butyl-4'-hydroxyphenyl) propionate, tetrakis[methylene-3-(3,5-di-tert-butyl-4-hydroxyphenyl)propionate]methane, 4,4'-butylidene bis-(3-methyl-6-tert-butylphenol), triethylene glycol-bis[3-(3-tert-butyl-4-hydroxy-5-methylphenyl)propionate], 3,9-bis{2-[3-(3-tert-butyl-4-hydroxy-5-methylphenyl)propionyloxy]-1,1-dimethylethyl}-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], N,N'-hexane-1,6-diyl bis[3-(3,5-di-tert-butyl-4-hydroxyphenylpropionamide)], 2,4-dimethyl-6-(1-methylpentadecyl)phenol, diethyl [[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene bis(oxyethylene) bis[3-(5-tert-butyl-4-hydroxy-m-tolyl) propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, and 2,6-di-tert-butyl-4-(4,6-bis(octylthio)-1,3,5-triazin-2-ylamino)phenol.

Examples of the phenolic antioxidant may include "Irganox 1010" ((R), hereinafter the same) and "Irganox 1076" manufactured by BASF SE, and "ADK STAB AO-50" and "ADK STAB AO-60" manufactured by ADEKA CORPORATION.

When compounded, the proportion of the antioxidant to be added is preferably 0.001 parts by mass or more, more preferably 0.01 parts by mass or more, and also preferably 1 part by mass or less, more preferably 0.5 parts by mass or less, with respect to 100 parts by mass of the thermoplastic resin.

Only one type of antioxidant may be included, or two or more types of antioxidants may be included. When two or more types are included, it is preferable that the total amount be in the above range.

In the thermoplastic resin and molded body of the present invention, in addition to the above-mentioned secondary components, various additives may be compounded to the extent not departing from the spirit of the present invention. As the additive, at least one additive selected from a flame retardant, a flame retardant auxiliary, an ultraviolet absorber, a mold release agent, and a coloring agent is exemplified, and it is preferable that at least one of a flame retardant and a mold release agent be included.

Also, an antistatic agent, a fluorescent brightening agent, an antifogging agent, a flow improver, a plasticizer, a dispersing agent, an antibacterial agent, and the like may be added as long as the desired various physical properties are not significantly impaired.

<Ultraviolet Absorber>

Examples of the ultraviolet absorber may include, in addition to an inorganic ultraviolet absorber such as cerium oxide and zinc oxide, an organic ultraviolet absorber such as a benzotriazole compound, a benzophenone compound, a salicylate compound, a cyanoacrylate compound, a triazine compound, an oxanilide compound, a malonate ester compound, a hindered amine compound, and a phenyl salicylate-based compound. Among these, benzotriazole-based and benzophenone-based organic ultraviolet absorbers are preferable. In particular, specific examples of the benzotriazole compound may include 2-(2'-hydroxy-5'-methylphenyl)benzotriazole, 2-[2'-hydroxy-3',5'-bis(a,a-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-5'-tert-octylphenyl)-benzotriazole, 2,2'-methylene bis[4-(1,1,3,3-tetramethylbutyl)-6-(2N-benzotriazol-2-yl)phenol], 2-(4,6-diphenyl-1,3,5-triazin-2-yl)-5-[(hexyl)oxy]-phenol, 2-[4,6-bis(2,4-dimethylphenyl)-1,3,5-triazin-2-yl]-5-(octyloxy) phenol, 2,2'-(1,4-phenylene) bis[4H-3,1-benzoxazin-4-one], [(4-methoxyphenyl)-methylene]-propanedioic acid-dimethyl ester, 2-(2H-benzotriazol-2-yl)-p-cresol, 2-(2H-benzotriazol-2-yl)-4,6-bis(1-methyl-1-phenylmethyl)phenol, 2-[5-chloro(2H)-benzotriazol-2-yl]-4-methyl-6-(tert-butyl) phenol, 2,4-di-tert-butyl-6-(5-chlorobenzotriazol-2-yl)phenol, 2-(2H-benzotriazol-2-yl)-4-(1,1,3,3-tetrabutyl)phenol, 2,2'-methylene bis[6-(2H-benzotriazol-2-yl)-4-(1,1,3,3-tetrabutyl)phenol], and [methyl-3-[3-tert-butyl-5-(2H-benzotriazol-2-yl)-4-hydroxyphenyl]propionate-polyethylene glycol] condensation product. Among the above, 2-(2'-hydroxy-5'-tert-octylphenyl)benzotriazole and 2,2'-methylene-bis[4-(1,1,3,3-tetramethylbutyl)-6-(2N-benzotriazol-2-yl)phenol] are preferable. Also, specific examples of the benzophenone-based ultraviolet absorber may include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone, and 2,2',4,4'-tetrahydroxy-benzophenone. In addition, specific examples of the phenyl salicylate-based ultraviolet absorber may include phenyl salicylate and 4-tert-butyl-phenyl salicylate. Furthermore, specific examples of the triazine-based ultraviolet absorber may include 2-(4,6-diphenyl-1,3,5-triazin-2-yl)-5-[(hexyl)oxy]-phenol and 2-[4,6-bis(2,4-dimethylphenyl)-1,3,5-triazin-2-yl]-5-(octyloxy)phenol. Moreover, specific examples of the hindered amine-based ultraviolet absorber include bis(2,2,6,6-tetramethylpiperidin-4-yl) sebacate.

When compounded, the proportion of the ultraviolet absorber to be added is preferably 0.01 parts by mass or more, more preferably 0.1 parts by mass or more, and also preferably 3 parts by mass or less, more preferably 1 part by mass or less, with respect to 100 parts by mass of the thermoplastic resin.

Only one type of ultraviolet absorber may be used, or two or more types of ultraviolet absorbers may be used. When two or more types are used, it is preferable that the total amount be in the above range.

<Flame Retardant>

In the thermoplastic resin and molded body of the present invention, as the flame retardant, an organometallic salt-based flame retardant, phosphorus-based flame retardant, silicone-based flame retardant, or the like may be compounded. As the flame retardant that can be used in the present invention, the flame retardants (flame retardant compositions) described in paragraphs 0085 to 0093 of Japanese Patent Laid-Open No. 2016-183422 are exemplified, the contents of which are incorporated herein by reference. Specific examples of the flame retardant (flame retardant composition) include a halogen-based flame retardant, an organometallic salt-based flame retardant, a phosphorus-based flame retardant, a silicone-based flame retardant, an antimony-based flame retardant, and a flame retardant auxiliary.

<Mold Release Agent>

Examples of the mold release agent that can be included in the thermoplastic resin and molded body may include a mold release agent such as a carboxylate ester, a polysiloxane compound, and a paraffin wax (polyolefin-based). Specific examples thereof may include at least one compound selected from the group of an aliphatic carboxylic acid, an ester of an aliphatic carboxylic acid and an alcohol, an aliphatic hydrocarbon compound with a number average molecular weight of 200 to 15000, and a polysiloxane-based silicone oil. Examples of the aliphatic carboxylic acid may include a saturated or unsaturated, aliphatic monovalent, divalent, or trivalent carboxylic acid. Here, the aliphatic carboxylic acid encompasses an alicyclic carboxylic acid as well. Among these, the preferred aliphatic carboxylic acid is a monovalent or divalent carboxylic acid having 6 to 36 carbon atoms, and an aliphatic saturated monovalent carboxylic acid having 6 to 36 carbon atoms is still more preferable. Specific examples of the aliphatic carboxylic acid may include palmitic acid, stearic acid, valeric acid, caproic acid, capric acid, lauric acid, arachic acid, behenic acid, lignoceric acid, cerotic acid, melissic acid, tetratriacontanoic acid, montanic acid, glutaric acid, adipic acid, and azelaic acid. As the aliphatic carboxylic acid in the ester of an aliphatic carboxylic acid and an alcohol, those that are the same as the above aliphatic carboxylic acids can be used. Meanwhile, examples of the alcohol may include a saturated or unsaturated, monohydric or polyhydric alcohol. These alcohols may have a substituent such as a fluorine atom or an aryl group. Among these, a monohydric or polyhydric, saturated alcohol having 30 or less carbon atoms is preferable, and an aliphatic saturated monohydric alcohol or polyhydric alcohol having 30 or less carbon atoms is still more preferable. Here, the aliphatic compound encompasses an alicyclic compound as well. Specific examples of the alcohol may include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol. Note that the above ester compound may contain the aliphatic carboxylic acid and/or the alcohol as impurities, and may be a mixture of a plurality of compounds. Specific examples of the ester of an aliphatic carboxylic acid and an alcohol may include beeswax (a mixture mainly composed of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate. Examples of the aliphatic hydrocarbon with a number average molecular weight of 200 to 15000 may include liquid paraffin, paraffin wax, microwax, polyethylene wax, Fischer-Tropsch wax, and oligomer of an α-olefin having 3 to 12 carbon atoms. Here, the aliphatic hydrocarbon includes an alicyclic hydrocarbon as well. Also, these hydrocarbon compounds may be partially oxidized. Among these, paraffin wax, polyethylene wax, or a partially oxidized product of polyethylene wax is preferable, and paraffin wax and polyethylene wax are still more preferable. The number average molecular weight is preferably 200 to 5000. These aliphatic hydrocarbons may be a single substance, or it may be a mixture of materials with various constituent components and molecular weights, as long as the main component is in the above range. Examples of the polysiloxane-based silicone oil may include dimethyl silicone oil, phenyl methyl silicone oil, diphenyl silicone oil, and fluorinated alkyl silicone. Two or more types of them may be used in combination.

When compounded, the proportion of the mold release agent to be added is preferably 0.001 parts by mass or more, more preferably 0.01 parts by mass or more, and also preferably 2 parts by mass or less, more preferably 1 part by mass or less, with respect to 100 parts by mass of the thermoplastic resin.

Only one type of mold release agent may be used, or two or more types of mold release agents may be used. When two or more types are used, it is preferable that the total amount be in the above range.

<Coloring Agent>

The coloring agent may be either a dye or a pigment, and examples thereof may include an inorganic pigment, an organic pigment, and an organic dye. Examples of the inorganic pigment may include carbon black, a sulfide-based pigment such as cadmium red and cadmium yellow; a silicate salt-based pigment such as ultramarine blue; an oxide-based pigment such as titanium oxide, zinc oxide, red iron oxide, chromium oxide, iron black, titanium yellow, zinc-iron brown, titanium cobalt green, cobalt green, cobalt blue, copper-chromium black, and copper-iron black; a chromic acid-based pigment such as lead yellow and molybdate orange; and a ferrocyanide-based pigment such as iron blue. In addition, examples of the organic pigment and organic dye as the coloring agent may include a phthalocyanine-based dye/pigment ("dye/pigment" refers to a dye or pigment, hereinafter the same) such as copper phthalocyanine blue and copper phthalocyanine green; an azo dye/pigment such as nickel azo yellow; a condensed polycyclic dye/pigment such as thioindigo-based, perinone-based, perylene-based, quinacridone-based, dioxazine-based, isoindolinone-based, and quinophthalone-based dyes/pigments; and quinoline-based, anthraquinone-based, heterocyclic, and methyl dyes/pigments. Then, among these, titanium oxide, carbon black, cyanine-based, quinoline-based, anthraquinone-based, and phthalocyanine-based dyes/pigments, and the like are preferable from the standpoint of thermal stability.

Also, the coloring agent may be masterbatched for use with polystyrene resin, polycarbonate resin, or acrylic resin for the purpose of improving handling properties during extrusion and improving dispersibility in the resin composition.

When compounded, the proportion of the coloring agent to be added is preferably 5 parts by mass or less, more preferably 3 parts by mass or less, and still more preferably 2 parts by mass or less, and also 0.1 parts by mass or more, with respect to 100 parts by mass of the thermoplastic resin. Only one type of coloring agent may be used, or two or more types of coloring agents may be used. When two or more types are used, it is preferable that the total amount be in the above range.

EXAMPLES

<Weight Average Molecular Weight (Weight Average Molecular Weight (Mw) in Terms of Polystyrene)>

The standard curve was created using GPC (gel permeation chromatography) with chloroform as the developing solvent and a standard polystyrene (Shodex STANDARD, SM-105) with a known molecular weight (molecular weight distribution=1). From the measured standard polystyrene, the elution time and molecular weight value for each peak were plotted and approximated by a cubic equation to form a calibration curve.

Then, based on the obtained calibration curve, the weight average molecular weight (Mw) was determined as the value in terms of polystyrene from the following expression.

$$Mw = \sum(Wi \times Mi)/\sum(Wi) \quad \text{[Calculation expression]}$$

(In the above expression, i represents the i-th division point when the molecular weight M is divided, Wi represents the i-th weight, and Mi represents the i-th molecular weight. In addition, the molecular weight M represents the molecular weight in terms of polystyrene at the same elution time of the calibration curve.)

[Measurement Conditions]

Apparatus: LabSolutions manufactured by Shimadzu Corporation

Column: guard column (Shodex GPC K-G 4A)×1, analytical column (Shodex GPC K-805L)×2

Solvent: chloroform (HPLC grade)

Injection volume: 10 μL

Sample concentration: 2000 ppm

Solvent flow rate: 1 mL/min

Measurement temperature: 40° C.

Detector: RI

<Measurement of Glass Transition Temperature (Tg)>

The measurement sample was prepared by accurately weighing 5 to 12 mg of the test specimen into a sample container for AI autosampler (RDC aluminum pan, cylindrical container with a diameter of 6.8 mm and a height of 2.5 mm) and sealing the top of the sample container with a cover for AI autosampler.

The measurement was carried out using a differential scanning calorimeter (DSC) under a nitrogen atmosphere (nitrogen flow rate: 50 ml/min), and 10.0 mg of sapphire was used as the reference material in the reference cell. Then, the measurement sample that had been adjusted to 30° C. was heated up to 280° C. at 20° C./min and then cooled down to 30° C. by cooling at 20° C./min. Thereafter, the temperature was increased to 280° C. at 10° C./min to perform the measurement.

Measurement apparatus: differential scanning calorimeter (DSC) (product name "DSC-7020," manufactured by Hitachi High-Tech Science Corporation)

Note that the melting point (Tm) could also be measured along with the Tg by the above-mentioned method.

<Thermal Decomposition Temperature>

1%-Thermal mass reduction start temperature and mass reduction proportion at 500° C.

10 mg of the measurement sample was accurately weighed in an aluminum pan (AI open type sample container φ5.2 H2.5 mm). The measurement was carried out under atmospheric air. 0.00519 g of α-alumina was used as the reference material. The sample temperature was adjusted to 30° C., increased to 500° C. at 10° C./min, and the mass reduction temperature by 1% by mass was defined as the "1%-thermal mass reduction start temperature." Also, the proportion of the mass reduction of the sample at 500° C., which was based on the mass of the sample before heating, was defined as the "mass reduction proportion at 500° C. (%)." In the table below, the values for "mass retention rate at 500° C. (%)", that is, 100−"mass reduction proportion at 500° C. (%)," are shown.

Measurement apparatus: simultaneous thermogravimetric analyzer (TG/DTA) (manufactured by Hitachi High-Tech Science Corporation, TG/DTA 7300)

<Thermal Analysis (Melting Point and the Like)>

The measurement sample was prepared by accurately weighing 5 mg of the test specimen into a sample container for AI autosampler (RDC aluminum pan, cylindrical container with a diameter of 6.8 mm and a height of 2.5 mm) and sealing the top of the sample container with a cover for AI autosampler.

The measurement was carried out using a differential scanning calorimeter (DSC) under a nitrogen atmosphere (nitrogen flow rate: 50 ml/min), and 10.0 mg of sapphire was used as the reference material in the reference cell. Then, the measurement sample that had been adjusted to 30° C. was heated up to 280° C. at 20° C./min and then cooled down to −10° C. by cooling at 20° C./min. Thereafter, the temperature was increased to 280° C. at 10° C./min to perform the measurement.

Measurement apparatus: differential scanning calorimeter (DSC) (product name “DSC-7020,” manufactured by Hitachi High-Tech Science Corporation)

<Molding of Test Specimen>

Pellets of the resins and resin compositions obtained in the Examples and the like, which will be mentioned later, were dried in a hot air circulation type dryer at 120° C. for 4 hours. Thereafter, ISO multipurpose test specimens (3 mm thickness and 4 mm thickness) were molded with an injection molding machine under conditions with a cylinder temperature of 280° C., a metal mold temperature of 80° C., and a molding cycle of 45 seconds. The injection molding machine used was “PE100” (trade name) manufactured by Sodick Co., Ltd.

More specifically, type-A test specimens of ISO 3167:93 (JIS K 7139:96) were produced and used for the following evaluation tests.

<Charpy Impact Test>

Using the above-mentioned ISO multipurpose test specimen with a thickness of 3 mm, the Charpy impact test (notched, unit: kJ/m2) was performed at 23° C. in accordance with the ISO-179 standard.

<Flowability (Q Value)>

The melt flow volume per unit time (ml/sec) measured at 280° C. and 160 kg load is shown (CFT-500D model (nozzle diameter 1 mm×nozzle length 10 mm) manufactured by Shimadzu Corporation was used to measure the melt flow volume, and the value per unit time was calculated from the stroke=7.0 to 10.0 mm).

<Evaluation of Flame Retardancy (LOI)>

The above-mentioned ISO multipurpose test specimen with a thickness of 4 mm was placed in a thermostatic chamber at a temperature of 23° C. and a relative humidity of 50%, the humidity was controlled for 88 hours, and the test was carried out in accordance with JIS-K-7201-2 using a candle type flammability tester, AC2 model (manufactured by Toyo Seiki Seisaku-sho, Ltd.). A material with a combustion oxygen index (LOI value) of 26 or more in this test is considered to be flame retardant (self-extinguishable). Note that, in the table below, the evaluation item for flame retardancy is denoted as “LOI”

<Chemical Resistance Test>

In an environment of 23° C., a fixture shown in FIG. 5 below (three-point bending load fixture 1) was used, which can apply a three-point bending load.

The ISO multipurpose test specimen with a thickness of 4 mm obtained as described above was attached to the lower center of a test specimen attaching fixture 2 in FIG. 5, and then the chemicals described in Table 1 below were each applied. By attaching a cylinder for caulking adjustment 3, which was for adjusting the amount of strain, to the test specimen attaching fixture 2 and fixing the test specimen with a thumbscrew 4, the amount of strain could be adjusted to be 0.72% or 0.24%.

With the ISO multipurpose test specimen with a thickness of 4 mm fixed to the test specimen attaching fixture 2, the test specimen was caulked such that the amount of strain was 0.72% or 0.4%. After 8 to 24 hours, the molded product was released from the caulking, the applied chemicals were then wiped off, and the chemical resistance was visually checked according to the following criteria.

Particularly good: No significant appearance defects are observed.

Good: The above appearance defects are observed, but they are minor or the defect incidence rate is less than 50%.

Poor: The above appearance defects are exhibited and at a level that makes it difficult to use the product.

TABLE 1

| Name of chemical (product) | Manufacturer |
|---|---|
| Neutrogena ® Ultra Sheer ® DRY-TOUCH SUNSCREEN (Broad Spectrum SPF 100+) | Johnson & Johnson |
| Magiclean ™ | Kao Corporation |
| Acetone special grade reagent | FUJIFILM Wako Pure Chemical Corporation |

(Example 1-1) <Kolben Scale/Catalyst: Tetraphenylphosphonium Phenoxide>

In a 300 ml four-neck flask equipped with a stirrer, 38.54 g (0.35 mol) of hydroquinone (HQ), 85.42 g (0.35 mol) of dimethyldiphenoxysilane, and 10 μmol/mol of tetraphenylphosphonium phenoxide as a catalyst (the catalyst amount is the relative number of moles to hydroquinone) were placed, and the inside of the system was replaced to a nitrogen atmosphere. The raw materials were heated and melted at 190° C., and stirred for 10 minutes. The reaction was then carried out over 110 minutes while phenol distilled from the reaction system was condensed and removed with a condenser tube. The inside of the reaction system was kept at 220° C. and less than 1 hPa for further 90 minutes to obtain a colorless polysiloxane. Note that, during the pressure reduction, the pressure was adjusted so that it was changed in stages to 43,000 Pa, 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 43,046.

When the DSC measurement of this polysiloxane was carried out, the glass transition temperature (Tg) was −0.6° C. As a result of measuring the weight reduction using the TG-DTA, the 1% weight reduction temperature was 331° C.

Other properties of the polysiloxane obtained in Example 1-1 were as follows.

| | |
|---|---|
| Molar ratio of raw materials | HQ:BPA (bisphenol A) = 10:0 |
| Mw | 43,046 |
| Mn | 13,734 |
| Mw/Mn | 3.134 |
| Tg | −0.6° C. |
| 1% weight reduction temperature (° C.) | 331° C. |
| 3% weight reduction temperature (° C.) | 372° C. |
| 5% weight reduction temperature (° C.) | 393° C. |
| 10% weight reduction temperature (° C.) | 430° C. |
| Weight retention rate at 500° C. (%) | 87% |
| Weight reduction rate at 500° C. (%) | 13% |

Also, the DSC chart of the thermoplastic resin (SiHQ) obtained in Example 1-1 is shown in FIG. 1.

(Example 1-2) <Kolben Scale/Catalyst: Cesium Carbonate>

In a 300 ml four-neck flask equipped with a stirrer, 38.54 g (0.350 mol) of hydroquinone, 86.02 g (0.353 mol) of dimethyldiphenoxysilane, and 3 μmol/mol of cesium carbonate as a catalyst (the catalyst amount is the relative number of moles to hydroquinone) were placed, and the inside of the system was replaced to a nitrogen atmosphere. The raw materials were heated and melted at 190° C., and stirred for 30 minutes.

The transesterification reaction was then carried out over 130 minutes while phenol distilled from the reaction system was condensed and removed with a condenser tube, and the inside of the system was kept at 250° C. and less than 1 hPa for further 90 minutes to obtain a colorless polysiloxane. Note that, during the pressure reduction, the pressure was adjusted so that it was changed in stages to 27,000 Pa, 20,000 Pa, 16,000 Pa, 12,000 Pa, 10,000 Pa, 8,000 Pa, 6,000 Pa, 4,000 Pa, 2,000 Pa, 1,000 Pa, and less than 100 Pa.

When the GPC measurement of the obtained polysiloxane was carried out, the Mw was 64,261. Also, the Tg and Tm (melting point) of the polysiloxane were 0° C. and 103° C., respectively, and these Tg and Tm values were generally the same for the Examples abbreviated as SiHQ (Examples 1-1 to 1-3, 1-5, and 1-6). That is, in all of these Examples, the Tg of the polysiloxane was about 0° C. and in the range of −1° C. to 1° C.

(Example 1-3) <Bench Scale: Repolymerization of Once-Polymerized Resin>

In a 10 L reaction tank equipped with a helical ribbon stirrer, 1.349 kg (12.25 mol) of hydroquinone, 3.035 kg (12.44 mol) of dimethyldiphenoxysilane, and 3 μmol/mol of cesium carbonate as a catalyst (the catalyst amount is the relative number of moles to hydroquinone) were placed, and the inside of the system was replaced to a nitrogen atmosphere. The raw materials were heated and melted at 190° C., and stirred for 20 minutes.

The transesterification reaction was then carried out over 120 minutes while phenol distilled from the reaction system was condensed and removed with a condenser tube, and the inside of the system was kept at 250° C. and less than 1 hPa for further 120 minutes. Thereafter, the inside of the system was returned to normal pressure with nitrogen, and a colorless polysiloxane was obtained. Note that, during the pressure reduction, the pressure was adjusted so that it was changed in stages to 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out at this stage, the Mw was 26,798.

Next, the obtained polysiloxane was pulverized and placed into a similar reaction tank again, and dried under reduced pressure. Then, the polysiloxane was melted at 190° C. and stirring was started, and the temperature was increased to 250° C. After keeping this state for 140 minutes, the pressure was recovered with nitrogen, and a colorless polysiloxane was then obtained.

When the GPC measurement of this polysiloxane was carried out, the Mw was 39,700.

Example 1-4

A PC resin (manufactured by Mitsubishi Gas Chemical Company, Inc., lupilon (R) E2000) and the resin of SiHQ (SiHQ polymerized twice with the above Mw=39,700) obtained in Example 1-3 were each weighed to achieve the amounts compounded described in Table 2 below (% by weight: hereinafter the same). Thereafter, after mixing in a tumbler for 15 minutes, the mixture was melted and kneaded in a vented twin-screw extruder ("twin-screw segment extruder 2D30WS" manufactured by Toyo Seiki Seisaku-sho, Ltd.) at a cylinder temperature of 280° C., and a pellet-shaped resin composition was obtained by strand cutting.

(Example 1-5) <Bench Scale, Prolonged Heating/Catalyst: Cesium Carbonate)>

In a 10 L reaction tank equipped with a helical ribbon stirrer, 2.292 kg (20.81 mol) of hydroquinone, 5.151 kg (21.11 mol) of dimethyldiphenoxysilane, and 3 μmol/mol of cesium carbonate as a catalyst (the catalyst amount is the relative number of moles to hydroquinone) were placed, and the inside of the system was replaced to a nitrogen atmosphere. The raw materials were heated and melted at 190° C., and stirred for 20 minutes.

The transesterification reaction was then carried out over 150 minutes while phenol distilled from the reaction system was condensed and removed with a condenser tube, and the inside of the system was kept at 250° C. and less than 1 hPa for further 240 minutes. Thereafter, the inside of the system was returned to normal pressure with nitrogen, and a colorless polysiloxane was obtained. Note that, during the pressure reduction, the pressure was adjusted so that it was changed in stages to 43,000 Pa, 24,000 Pa, 20,000 Pa, 16,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 39,970.

(Example 1-6) <Kolben Scale, Prolonged Heating/Catalyst: Sodium Bicarbonate)>

In a 500 ml four-neck flask equipped with a stirrer, 77.08 g (0.700 mol) of hydroquinone, 173.34 g (0.710 mol) of dimethyldiphenoxysilane, and 12 μmol/mol of sodium bicarbonate as a catalyst (the catalyst amount is the relative number of moles to hydroquinone) were placed, and the inside of the system was replaced to a nitrogen atmosphere. The raw materials were heated and melted at 190° C., and stirred for 30 minutes.

The transesterification reaction was then carried out over 100 minutes while phenol distilled from the reaction system was condensed and removed with a condenser tube, and the inside of the system was kept at 240° C. and less than 1 hPa for further 180 minutes to obtain a colorless polysiloxane. Note that, during the pressure reduction, the pressure was adjusted so that it was changed in stages to 27,000 Pa, 24,000 Pa, 20,000 Pa, 15,000 Pa, 10,000 Pa, 6,000 Pa, 2,000 Pa, and less than 100 Pa.

When the GPC measurement of the obtained polysiloxane was carried out, the Mw was 66,267.

Comparative Examples A to D

Comparative Example A

A PC resin (manufactured by Mitsubishi Engineering-Plastics Corporation, aromatic PC: Iupilon S3000) was used alone.

Comparative Example B

A commercially available siloxane polymer having the following structure was used alone (Si-PC EXL1414T).

[Chem. 20]

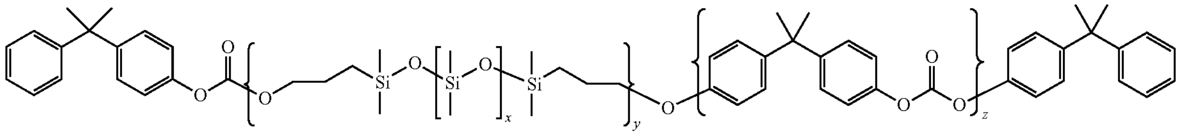

Comparative Example C

In Comparative Example C ("SiBPA-PC"), a polymer mainly composed of the same component (aromatic PC: Iupilon E2000) as in Example 1-4 was produced as follows, according to the steps in Example 1-4.

In a 10 L reactor equipped with a stirrer, 2370.77 g (10.40 mol) of 2,2-bis(4-hydroxyphenyl)propane, 1859.19 g (7.62 mol) of dimethyldiphenoxysilane, 750.97 g (3.51 mol) of diphenyl carbonate, and 10.0 μmol/mol of tetraphenylphosphonium phenoxide as a catalyst (the catalyst amount is the relative number of moles to 2,2-bis(4-hydroxyphenyl)propane) were placed, and the inside of the system was replaced to a nitrogen atmosphere. The raw materials were heated and melted at 190° C., and stirred for 40 minutes.

The transesterification reaction was then carried out over 1 hour and 30 minutes while phenol distilled from the reaction system was condensed and removed with a condenser tube, and the inside of the system was kept at 260° C. with a pressure reduction degree of 1 hPa or less for further 1 hour and 15 minutes to obtain a colorless and transparent polycarbonate copolymer with an arylene siloxane structure. Note that, during the pressure reduction, the pressure was adjusted so that it was changed in stages from the atmospheric pressure to 27,000 Pa, 24,000 Pa, 20,000 Pa, 17,000 Pa, 14,000 Pa, 10,000 Pa, 8,000 Pa, 4,000 Pa, 2,000 Pa, and 100 Pa or less.

The Mw of the siloxane-containing polycarbonate copolymer was measured using GPC and was 34,647.

A PC resin (manufactured by Mitsubishi Engineering-Plastics Corporation, aromatic PC: Iupilon E2000N) and the resin of SiBPA-PC obtained as described above were each weighed to achieve the amounts compounded described in Table 2 below. Thereafter, after mixing in a tumbler for 15 minutes, the mixture was melted and kneaded in a vented twin-screw extruder ("twin-screw segment extruder 2D30WS" manufactured by Toyo Seiki Seisaku-sho, Ltd.) at a cylinder temperature of 280° C., and a pellet-shaped resin composition was obtained by strand cutting.

Comparative Example D

A pellet-shaped resin composition was obtained in the same manner as in Comparative Example C, except that the amounts compounded of the PC resin (manufactured by Mitsubishi Engineering-Plastics Corporation, aromatic PC: Iupilon E2000) and the resin of SiBPA-PC obtained as described above were each changed to those described in Table 2 below.

The results of evaluating the above-mentioned Example 1-4 and these Comparative Examples A-D are shown in Table 2 below.

TABLE 2

| | | Example1-4 | Comparative Example A | Comparative Example B | Comparative Example C | Comparative Example D |
|---|---|---|---|---|---|---|
| PC resin: E2000 | % | 94.1 | | Si—PC | 92.5 | 85.0 |
| PC resin: S3000 | % | | 100 | EXL1414T | | |
| SiHQ | % | 5.9 | 0 | | 0 | 0 |
| SiBPA-PC | % | 0 | 0 | | 7.5 | 15.0 |
| Si content | % | 1.0 | 0 | — | 0.5 | 1.0 |
| Glass transition point | ° C. | 140.3 | 146.0 | 143.2 | 138.8 | 131.5 |
| Impact resistance | kJ/m2 | 75.0 | 70.8 | 73.5 | 79.6 | 61.8 |
| Flowability (Q value) | 0.01 ml/sec | 7.4 | 8.0 | 7.1 | 6.2 | 11.8 |
| LOI (flame retardancy) | % | 30.3 | 26.0 | 29.3 | 28.3 | 30.0 |

| Chemical resistance | Strain/% | Time/h | | | | | |
|---|---|---|---|---|---|---|---|
| Neutrogena | 0.24 | 8 | Particularly good | Particularly good | Poor | Particularly good | Particularly good |
| Magiclean | 0.72 | 24 | Good | Poor | Poor | Poor | Poor |
| Acetone | 0.72 | 12 | Good | Poor | Good | Poor | Poor |

As described above, it was confirmed that thermoplastic resins with various excellent properties such as impact resistance, flowability, flame retardancy, and chemical resistance could be obtained according to each Example. Also, for adjusting the molecular weight of the thermoplastic resin mainly produced, it was useful to repolymerize the resin obtained in one polymerization (Example 1-3) and to prolong the time of the polymerization reaction (Example 1-5). In particular, although it was observed that the molecular weight of the thermoplastic resin produced tended to be difficult to be increased when the scale was larger than in Examples 1-1, 1-2, and 1-6, which were carried out on the kolben scale, thermoplastic resins with a sufficiently high molecular weight were produced even in Example 1-3 and Example 1-5, which were carried out on the bench scale, by repolymerization and prolonged reaction time.

Example 2

The reaction was performed in the same manner as in Example 1-1, except that 61.4 g (0.33 mol) of 4,4'-biphenyldiol (BP), 90.28 g (0.37 mol) of dimethyldiphenoxysilane (DMDPS), and 3 μmol/mol of cesium carbonate as a catalyst (the catalyst amount is the relative number of moles to 4,4'-biphenyldiol) were used as raw materials. The physical properties of the obtained resin are shown in Table 3.

Comparative Example 1

The reaction was performed in the same manner as in Example 1-1, except that 18.24 g (0.08 mol) of bisphenol A (BPA), 21.96 g (0.09 mol) of dimethyldiphenoxysilane (DMDPS), and 7 μmol/mol of cesium carbonate as a catalyst (the catalyst amount is the relative number of moles to bisphenol A) were used as raw materials. The physical properties of the obtained resin are shown in Table 3.

TABLE 3

| | Diol compound | Mw | Weight reduction at 500° C. |
|---|---|---|---|
| Example 1-1 | SiHQ | 43,046 | 13% |
| Example 2 | SiBP | 46,000 | 5% |
| Comparative Example 1 | SiBPA | 48,000 | 63% |

Example 3

The reaction was performed in the same manner as in Example 1-1, except that 4.62 g (0.042 mol) of HQ, 22.3 g (0.098 mol) of bisphenol A (BPA) (that is, the molar ratio of HQ and BPA was HQ:BPA=3:7), 35.12 g (0.14 mol) of DMDPS, and 12 μmol/mol of sodium bicarbonate as a catalyst (the catalyst amount is the relative number of moles to the total amount of HQ and BPA) were used as raw materials. The reaction formula is shown below, and the physical properties of the obtained resin (SiHQBPA) are shown in Table 4 and Table 5.

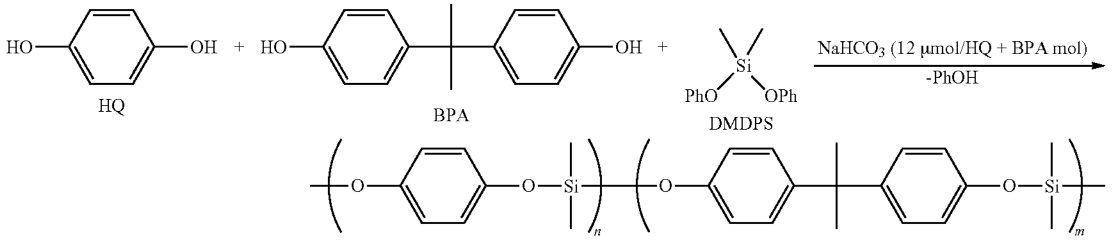

HQ BPA DMDPS

SiHQBPA

Example 4

The reaction was performed in the same manner as in Example 3, except that the molar ratio of HQ and BPA as raw materials was changed to HQ:BPA=5:5. The physical properties of the obtained resin (SiHQBPA) are shown in Table 4 and Table 5.

Example 5

The reaction was performed in the same manner as in Example 3, except that the molar ratio of HQ and BPA as raw materials was changed to HQ:BPA=7:3. The physical properties of the obtained resin (SiHQBPA) are shown in Table 4 and Table 5.

TABLE 4

| | Molar ratio of raw materials HQ:BPA (mol) | Mw | Mn | Mw/Mn | Molar ratio of HQ:BPA constitution of resin (SiHQBPA) according to NMR | Appearance | Tg (° C.) | nd | vd |
|---|---|---|---|---|---|---|---|---|---|
| Example 1-1 | 10:0 | 43,046 | 13,734 | 3.134 | 100:0 | White and rigid | −0.6 | — | — |
| Example 3 | 3:7 | 18,510 | 10,734 | 1.724 | 23:77 | Transparent and rigid | 35.1 | 1.575 | 28.75 |
| Example 4 | 5:5 | 34,705 | 20,999 | 1.653 | 47:53 | Transparent and rigid | 31.0 | 1.569 | 31.61 |
| Example 5 | 7:3 | 29,265 | 16,073 | 1.821 | 68:32 | Transparent and gummy | 19.1 | — | — |
| Comparative Example 1 | 0:10 | 48,185 | 27,621 | 1.744 | 0:100 | Transparent and rigid | 52.0 | 1.577 | 28.80 |

TABLE 5

| | Molar ratio of raw materials HQ:BPA | Weight reduction temperature (° C.) | | | | Weight retention rate at 500° C. |
|---|---|---|---|---|---|---|
| | (mol) | 1% | 3% | 5% | 10% | (%) |
| Example 1-1 | 10:0 | 331 | 372 | 393 | 430 | 87 |
| Example 3 | 3:7 | 304 | 351 | 373 | 399 | 74 |
| Example 4 | 5:5 | 332 | 366 | 382 | 407 | 78 |
| Example 5 | 7:3 | 320 | 344 | 377 | 404 | 75 |
| Comparative Example 1 | 0:10 | 243 | 328 | 356 | 393 | 37 |

The relationship between the weight reduction temperature and the % by weight of the thermoplastic resins obtained in Examples 1-1 and 3 to 5, Comparative Example 1, and Comparative Example 2 (PC), which will be mentioned later, is shown in FIG. 2.

From Table 5, FIG. 2, and other data, it was confirmed that SiHQBPA (Examples 1-1 and 3 to 5) exhibits good heat resistance at 400° C. or higher for all charging ratios and can retain about 80% of its weight even at 500° C., whereas the proportion of thermal decomposition is increased at 400° C. or higher in Comparative Example 1.

It was also revealed that, even with a charging ratio (HQ:BPA) of 3:7, the weight reduction at 400° C. or higher is mitigated. This result suggests that the addition of a small amount of HQ promotes char formation even when the BPA skeleton is included to a large extent.

Example 6

The reaction was performed in the same manner as in Example 1-1, except that 4.62 g (0.042 mol) of HQ, 18.21 g (0.098 mol) of BP (that is, the molar ratio of HQ and BP was HQ:BP=3:7), 35.12 g (0.14 mol) of DMDPS, and 12 μmol/mol of sodium bicarbonate as a catalyst (the catalyst amount is the relative number of moles to the total amount of HQ and BP) were used as raw materials. The reaction formula is shown below, and the physical properties of the obtained resin (SiHQBP) are shown in Table 6 and Table 7.

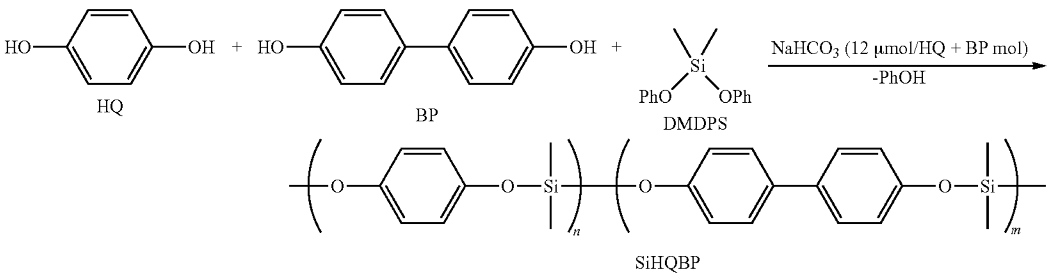

HQ BP DMDPS SiHQBP

Example 7

The reaction was performed in the same manner as in Example 6, except that the molar ratio of HQ and BP as raw materials was changed to HQ:BP=5:5. The physical properties of the obtained resin (SiHQBPA) are shown in Table 6 and Table 7.

Example 8

The reaction was performed in the same manner as in Example 6, except that the molar ratio of HQ and BP as raw materials was changed to HQ:BP=7:3. The physical properties of the obtained resin (SiHQBPA) are shown in Table 6 and Table 7.

Comparative Example 2

BPA-PC: For Iupilon S-3000N, which is a bisphenol A type polycarbonate resin manufactured by Mitsubishi Engineering-Plastics Corporation, the physical properties are shown in Table 7. Note that the glass transition temperature (Tg) of the polycarbonate resin of Comparative Example 2 was 147° C.

TABLE 6

| | Molar ratio of raw materials HQ:BPA (mol) | Mw | Mn | Mw/Mn | Molar ratio of HQ:BPA constitution of resin (SiHQBPA) according to NMR | Appearance | Tg (° C.) | nd | vd |
|---|---|---|---|---|---|---|---|---|---|
| Example 1-1 | 10:0 | 43,046 | 13,734 | 3.134 | 100:0 | White and rigid | −0.6 | — | — |

TABLE 6-continued

| | Molar ratio of raw materials HQ:BPA (mol) | Mw | Mn | Mw/ Mn | Molar ratio of HQ:BPA constitution of resin (SiHQBPA) according to NMR | Appearance | Tg (° C.) | nd | vd |
|---|---|---|---|---|---|---|---|---|---|
| Example 6 | 3:7 | 38,123 | 19,408 | 1.964 | 28:72 | Transparent and rigid | 39.9 | 1.604 | 30.20 |
| Example 7 | 5:5 | 44,463 | 26,579 | 1.673 | 47:53 | Transparent and rigid | 37.4 | 1.593 | 24.71 |
| Example 8 | 7:3 | 39,464 | 23,500 | 1.679 | 68:32 | Transparent and gummy | 22.2 | — | — |
| Example 2 | 0:10 | 46,638 | 25,348 | 1.840 | 0:100 | Transparent and rigid | 70.0 | 1.633 | 22.80 |
| Comparative Example 1 | HQ:BP = 0, BPA = 10 | 48,185 | 27,621 | 1.744 | 0:100 | Transparent and rigid | 52.0 | 1.577 | 28.80 |

TABLE 7

| | Molar ratio of raw materials HQ:BPA | Weight reduction temperature (° C.) | | | | Weight retention rate at 500° C. |
|---|---|---|---|---|---|---|
| | (mol) | 1% | 3% | 5% | 10% | (%) |
| Example 1-1 | 10:0 | 331 | 372 | 393 | 430 | 87 |
| Example 6 | 3:7 | 305 | 386 | 425 | — | 91 |
| Example 7 | 5:5 | 371 | 409 | 438 | — | 92 |
| Example 8 | 7:3 | 366 | 400 | 422 | — | 91 |
| Example 2 | 0:10 | 375 | 420 | >500 | — | 96 |
| Comparative Example 1 | HQ:BP = 0, BPA = 10 | 243 | 328 | 356 | 393 | 37 |
| Comparative Example 2 | BPA-PC | 417 | 458 | 474 | 486 | 80 |

The relationship between the weight reduction temperature and the % by weight of the thermoplastic resins obtained in Examples 1-1, 2, and 6 to 8 and Comparative Example 2 is shown in FIG. 3.

From Table 7, FIG. 3, and other data, it was confirmed that the SiBP homopolymer retains 95% or more of its weight even at 500° C. and is almost not thermally decomposed, and that even when copolymerized with HQ, SiHQBP exhibits very high heat resistance in the high temperature region and can retain 90% or more of its weight even at 500° C.

Comparative Example 2 is a commercially available bisphenol A polycarbonate, and it was confirmed that the weight retention rate at 500° C. is sharply decreased and no char is formed. Note that, in Comparative Example 2, as shown in FIG. 3 and other data, the weight retention rate is relatively good up to about 450° C., but the weight retention rate is sharply decreased in the higher temperature region. On the other hand, each Example is superior to Comparative Example 2 in that no such a sharp decrease in weight retention rate is observed, making it more practical.

Example 9

The reaction was performed in the same manner as in Example 1-1, except that 13.01 g (0.070 mol) of BP, 15.93 g (0.070 mol) of BPA (that is, the molar ratio of HQ and BPA was HQ:BPA=5:5), 35.12 g (0.14 mol) of DMDPS, and 12 μmol/mol of sodium bicarbonate as a catalyst (the catalyst amount is the relative number of moles to the total amount of HQ and BPA) were used as raw materials. The reaction formula is shown below, and the physical properties of the obtained resin (SiBPBPA) are shown in Table 8 and Table 9.

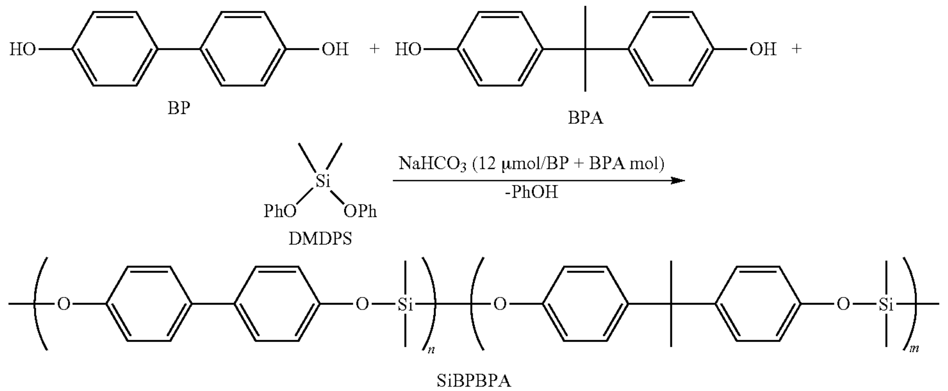

BP

BPA

DMDPS

SiBPBPA

TABLE 8

| | Molar ratio of raw materials HQ:BPA (mol) | Mw | Mn | Mw/ Mn | Molar ratio of HQ:BPA constitution of resin (SiHQBPA) according to NMR | Appearance | Tg (° C.) | nd | vd |
|---|---|---|---|---|---|---|---|---|---|
| Example 2 | 10:0 | 46,638 | 25,348 | 1.840 | 0:100 | Transparent and rigid | 70.0 | — | — |

TABLE 8-continued

| | Molar ratio of raw materials HQ:BPA (mol) | Mw | Mn | Mw/ Mn | Molar ratio of HQ:BPA constitution of resin (SiHQBPA) according to NMR | Appearance | Tg (° C.) | nd | vd |
|---|---|---|---|---|---|---|---|---|---|
| Example 9 | 5:5 | 17,713 | 7,799 | 2.271 | 50:50 | Transparent and rigid | 52.2 | 1.596 | 25.90 |
| Comparative Example 1 | BP:BPA = 0:10 | 48,185 | 27,621 | 1.744 | 0:100 | Transparent and rigid | 52.0 | 1.577 | 28.80 |

TABLE 9

| | Molar ratio of raw materials HQ:BPA | Weight reduction temperature (° C.) | | | | Weight retention rate at 500° C. |
|---|---|---|---|---|---|---|
| | (mol) | 1% | 3% | 5% | 10% | (%) |
| Example 2 | 10:0 | 375 | 420 | >500 | — | 96 |
| Example 9 | 5:5 | 305 | 386 | 425 | — | 91 |
| Comparative Example 1 | BP:BPA = 0:10 | 243 | 328 | 356 | 393 | 37 |
| Comparative Example 2 | BPA-PC | 417 | 458 | 474 | 486 | 80 |

The relationship between the weight reduction temperature and the % by weight of the thermoplastic resins obtained in Examples 2 and 9 and Comparative Examples 1 and 2 is shown in FIG. 4.

From Table 9, FIG. 4, and other data, it was confirmed that Example 2 (SiBP) and Example 9 (SiBPBPA) exhibit greatly improved heat resistance at high temperatures compared to that of Comparative Example 1 (SiBPA) and Comparative Example 2 (PC), and can retain 90% of their weight even at 500° C.

Example 10

DMDPS+HQ+DPC

In a 100 ml four-neck flask equipped with a stirrer, 15.48 g (0.14 mol) of hydroquinone, 24.02 g (0.098 mol) of dimethyldiphenoxysilane, 9.93 g (0.046 mol) of diphenyl carbonate, and 12 μmol/mol of sodium bicarbonate as a catalyst (the catalyst amount is the relative number of moles to hydroquinone) were placed, and the inside of the system was replaced to a nitrogen atmosphere. The raw materials were heated and melted at 190° C., and stirred for 30 minutes.

The transesterification reaction was then carried out over 130 minutes while phenol distilled from the reaction system was condensed and removed with a condenser tube, and the inside of the system was kept at 220° C. and less than 1 hPa for further 90 minutes to obtain a colorless polysiloxane. Note that, during the pressure reduction, the pressure was adjusted so that it was changed in stages to 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 41508.

When the DSC measurement of the above polysiloxane was carried out, the Tg was 24.8° C. As a result of measuring the weight reduction using the TG-DTA, the 1% weight reduction temperature was 307° C.

The physical properties of the obtained resin are shown in Table 10 and Table 11.

Example 11

DMDPS+BP+DPC

In a 100 ml four-neck flask equipped with a stirrer, 26.18 g (0.14 mol) of 4,4-dihydroxybiphenyl, 24.02 g (0.098 mol) of dimethyldiphenoxysilane, 9.93 g (0.046 mol) of diphenyl carbonate, and 12 μmol/mol of sodium bicarbonate as a catalyst (the catalyst amount is the relative number of moles to hydroquinone) were placed, and the inside of the system was replaced to a nitrogen atmosphere. The raw materials were heated and melted at 220° C., and stirred for 30 minutes.

The transesterification reaction was then carried out over 130 minutes while phenol distilled from the reaction system was condensed and removed with a condenser tube, and the inside of the system was kept at 260° C. and less than 1 hPa for further 90 minutes to obtain a colorless polysiloxane. Note that, during the pressure reduction, the pressure was adjusted so that it was changed in stages to 70,000 Pa, 53,000 Pa, 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 38951.

When the DSC measurement of the above polysiloxane was carried out, the Tg was 92.4° C. As a result of measuring the weight reduction using the TG-DTA, the 1% weight reduction temperature was 333° C.

The physical properties of the obtained resin are shown in Table 10 and Table 11.

Example 12

DMDPS+HQ+DPC+BPA

In a 100 ml four-neck flask equipped with a stirrer, 10.77 g (0.098 mol) of hydroquinone, 9.56 g (0.042 mol) of bisphenol-A, 23.70 g (0.097 mol) of dimethyldiphenoxysilane, 9.93 g (0.046 mol) of diphenyl carbonate, and 12 μmol/mol of sodium bicarbonate as a catalyst (the catalyst amount is the relative number of moles to hydroquinone) were placed, and the inside of the system was replaced to a nitrogen atmosphere. The raw materials were heated and melted at 190° C., and stirred for 30 minutes.

The transesterification reaction was then carried out over 130 minutes while phenol distilled from the reaction system was condensed and removed with a condenser tube, and the inside of the system was kept at 220° C. and less than 1 hPa for further 90 minutes to obtain a colorless polysiloxane. Note that, during the pressure reduction, the pressure was adjusted so that it was changed in stages to 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 71001.

When the DSC measurement of the above polysiloxane was carried out, the Tg was 40.3° C. As a result of measuring the weight reduction using the TG-DTA, the 1% weight reduction temperature was 352° C.

The physical properties of the obtained resin are shown in Table 10 and Table 11.

Example 13

DMDPS+BP+DPC+BPA

In a 100 ml four-neck flask equipped with a stirrer, 18.21 g (0.098 mol) of 4,4-dihydroxybiphenyl, 9.56 g (0.042 mol) of bisphenol-A, 23.70 g (0.097 mol) of dimethyldiphenoxysilane, 9.93 g (0.046 mol) of diphenyl carbonate, and 12 mol/mol of sodium bicarbonate as a catalyst (the catalyst amount is the relative number of moles to hydroquinone) were placed, and the inside of the system was replaced to a nitrogen atmosphere. The raw materials were heated and melted at 220° C., and stirred for 30 minutes.

The transesterification reaction was then carried out over 130 minutes while phenol distilled from the reaction system was condensed and removed with a condenser tube, and the inside of the system was kept at 220° C. and less than 1 hPa for further 90 minutes to obtain a colorless polysiloxane. Note that, during the pressure reduction, the pressure was adjusted so that it was changed in stages to 70,000 Pa, 53,000 Pa, 24,000 Pa, 22,000 Pa, 20,000 Pa, 18,000 Pa, 16,000 Pa, 14,000 Pa, 12,000 Pa, 10,000 Pa, 8,000 Pa, 6,000 Pa, 4,000 Pa, 2,000 Pa, 1,000 Pa, 500 Pa, and less than 100 Pa.

When the GPC measurement of the obtained polysiloxane was carried out, the Mw was 40839.

When the DSC measurement of the above polysiloxane was carried out, the Tg was 87.5° C. As a result of measuring the weight reduction using the TG-DTA, the 1% weight reduction temperature was 378° C.

The physical properties of the obtained resin are shown in Table 10 and Table 11.

As described above, Examples in which the hydroquinone-based compound was used as the diol compound provided polysiloxane resins with high heat resistance. It was also confirmed that SiHQ and SiBP have a suppressed weight reduction, especially in the high temperature region, and a char formation feature when thermal decomposition occurs. Such SiHQ and SiBP were confirmed to have higher heat resistance and flame retardancy compared to common polycarbonate resins of bisphenol A and others.

The invention claimed is:

1. A thermoplastic resin comprising a constituent unit (A) represented by the following general formula (I):

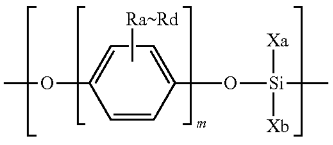

(I)

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group;

m is 1, a low molecular weight compound having a weight average molecular weight of 1,000 or less accounts for 1% by weight or less, and a proportion calculated from a GPC area ratio of the low molecular weight compound having a weight average molecular weight of 1,000 or less is 1% by weight or less.

TABLE 10

| | Charging ratio (% by weight) | | | | | Charging ratio (mol %) | | | | | Weight reduction temperature (° C.) | | | | Weight retention rate at | Tg |
|---|---|---|---|---|---|---|---|---|---|---|---|---|---|---|---|---|
| | DMDPS | HQ | BP | BPA | DPC | DMDPS | HQ | BP | BPA | DPC | 1% | 3% | 5% | 10% | 500° C. | (° C.) |
| Example 10 | 49 | 3 | 0 | 0 | 20 | 35 | 49 | 0 | 0 | 16 | 307 | 359 | 385 | 420 | 62% | 24.8 |
| Example 11 | 40 | 0 | 44 | 0 | 16 | 35 | 0 | 49 | 0 | 16 | 333 | 391 | 409 | 429 | 77% | 92.4 |
| Example 12 | 44 | 20 | 0 | 18 | 18 | 34 | 35 | 0 | 15 | 16 | 352 | 388 | 406 | 435 | 71% | 40.3 |
| Example 13 | 38 | 0 | 30 | 16 | 16 | 34 | 0 | 35 | 15 | 16 | 378 | 417 | 443 | 482 | 76% | 87.5 |

TABLE 11

| | Weight reduction temperature (° C.) | | | | Weight retention |
|---|---|---|---|---|---|
| | 1% | 3% | 5% | 10% | rate at 500° C. |
| Example 10 | 307 | 359 | 385 | 420 | 62% |
| Example 11 | 333 | 391 | 409 | 429 | 77% |
| Example 12 | 352 | 388 | 406 | 435 | 71% |
| Example 13 | 378 | 417 | 443 | 482 | 76% |
| Comparative Example 1 | 243 | 328 | 356 | 393 | 37% |
| Comparative Example 2 | 417 | 458 | 474 | 486 | 80% |

2. A thermoplastic resin comprising a constituent unit (A) represented by the following general formula (I):

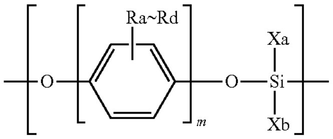

(I)

wherein

Ra to Rd each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group; and m is 1, wherein the thermoplastic resin further comprises at least one of constituent units (B-1) to (B-4) represented by any of the following formulas (II-1) to (II-4):

(II-1)

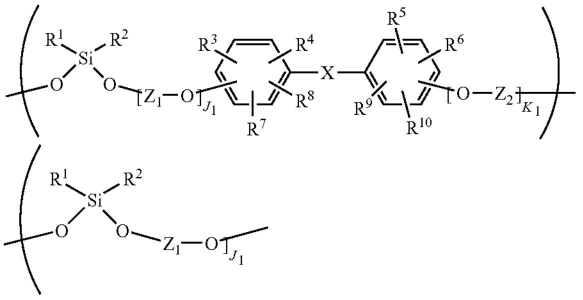

(II-2)

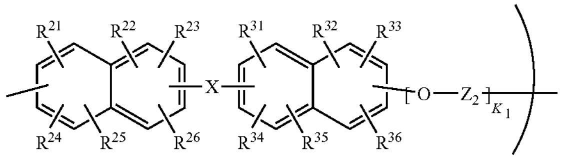

(II-3)

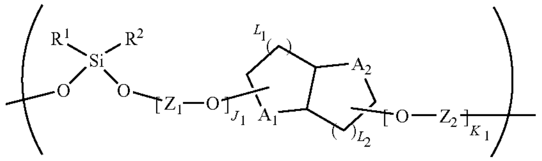

(II-4)

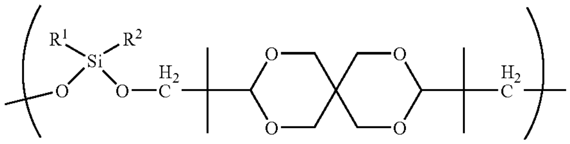

wherein $R^1$ and $R^2$ each independently represent an alkyl group having 1 to 20 carbon atoms and optionally having a substituent or an aryl group having 6 to 30 carbon atoms and optionally having a substituent;

$R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

$J_1$ each independently represents an integer of 0 to 5;

$K_1$ each independently represents an integer of 0 to 5;

the substituent is any of a halogen, a cyano group, an alkenyl group, an alkynyl group, and an alkoxy group;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

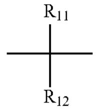

(2)

$$—S—$$

(3)

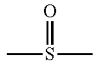

(4)

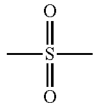

(5)

$$—O—$$

(6)

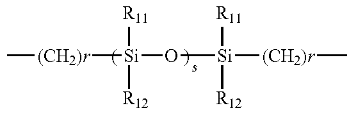

(7)

$$—(CH_2)r—$$

wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

3. The thermoplastic resin according to claim 2, wherein a molar ratio between the constituent unit (A) and the constituent units (B-1) to (B-4) in total is 0.1:99.9 to 100:0.

4. A thermoplastic resin comprising a constituent unit (A) represented by the following general formula (I):

(I)

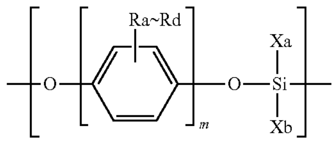

wherein

Ra to Rd each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group; and m is 1, wherein the thermoplastic resin further comprises at least one of constituent units (C-1) to (C-4) represented by any of the following formulas (III-1) to (III-4):

(III-1)

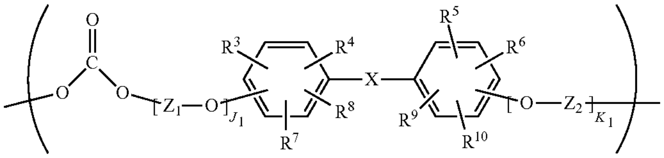

(III-2)

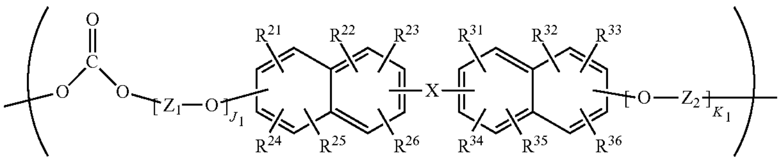

(III-3)

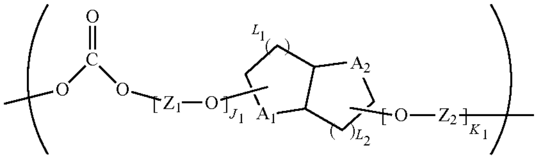

(III-4)

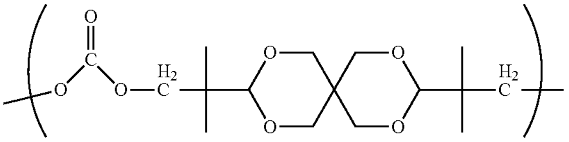

wherein $R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

the substituent is any of a halogen, a cyano group, an alkenyl group, an alkynyl group, and an alkoxy group;

$J_1$ each independently represents an integer of 0 to 5;

$K_1$ each independently represents an integer of 0 to 5;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

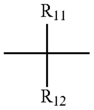

(2)

$—S—$ (3)

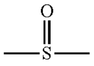

-continued (4)

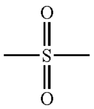

(5)

$—O—$ (6)

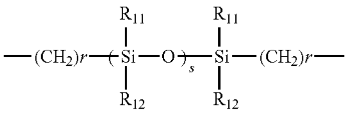

(7)

$—(CH_2)r—$ wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000.

5. The thermoplastic resin according to claim 2, further comprising at least one of constituent units (C-1) to (C-4) represented by any of the following formulas (III-1) to (III-4):

(III-1)

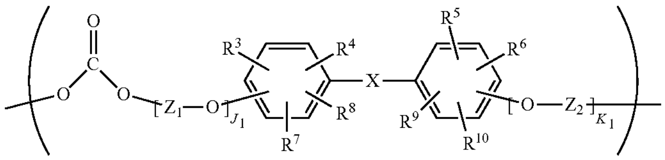

(III-2)

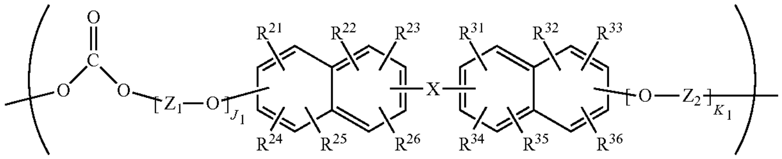

(III-3)

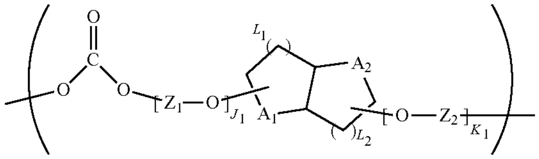

(III-4)

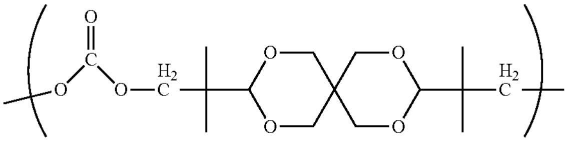

wherein $R^3$ to $R^{10}$, $R^{21}$ to $R^{26}$, and $R^{31}$ to $R^{36}$ each independently represent a hydrogen atom, a halogen atom, an alkoxy group having 1 to 5 carbon atoms and optionally having a substituent, an alkyl group having 1 to 20 carbon atoms and optionally having a substituent, an alkenyl group having 2 to 20 carbon atoms and optionally having a substituent, or an aryl group having 6 to 30 carbon atoms and optionally having a substituent;

$Z_1$ and $Z_2$ are each independently an alkylene group having 1 to 5 carbon atoms and optionally having a substituent;

the substituent is any of a halogen, a cyano group, an alkenyl group, an alkynyl group, and an alkoxy group;

$J_1$ each independently represents an integer of 0 to 5;

$K_1$ each independently represents an integer of 0 to 5;

$A_1$ and $A_2$ each independently represent any of —O— and —$CH_2$—;

$L_1$ and $L_2$ each independently represent an integer of 0 to 3;

X is a single bond, or any of structural formulas represented by the following formulas (1) to (7):

(1)

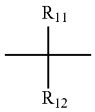

(2)

—S—

-continued (3)

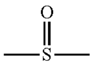

(4)

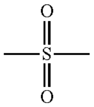

(5)

—O—

(6)

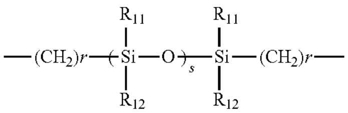

(7)

$—(CH_2)r—$ wherein $R_{11}$ and $R_{12}$ each independently represent a hydrogen atom, a halogen atom, an alkyl group having 1 to 20 carbon atoms and optionally having a substituent, or an aryl group having 6 to 30 carbon atoms and optionally having a substituent, or $R_{11}$ and $R_{12}$ are bonded to each other to form and represent a carbocycle or heterocycle having 1 to 20 carbon atoms and optionally having a substituent;

the substituent is any of a halogen, a cyano group, an alkenyl group, an alkynyl group, and an alkoxy group; and r and s each independently represent an integer of 0 to 5000;

wherein a molar ratio between the constituent unit (A) and the constituent units (B-1) to (B-4) in total and the constituent units (C-1) to (C-4) in total is 0.1:99.9 to 100:0.

6. The thermoplastic resin according to claim 1, consisting only of the constituent unit (A).

7. The thermoplastic resin according to claim 1, wherein, in the general formula (I), $R_a$ to $R_d$ are each hydrogen and Xa and Xb are each a methyl group.

8. The thermoplastic resin according to claim 1, having a weight average molecular weight (Mw) in terms of polystyrene of 10,000 to 300,000.

9. A thermoplastic resin comprising a constituent unit (A) represented by the following general formula (I):

(I)

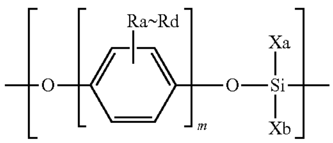

wherein

Ra to Rd each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group; and m is 1, wherein the thermoplastic resin has a 1% mass reduction thermal decomposition temperature of 300° C. or higher.

10. A thermoplastic resin comprising a constituent unit (A) represented by the following general formula (I):

(I)

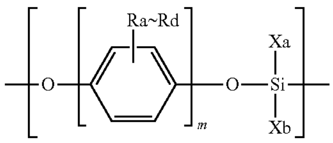

wherein

Ra to Rd each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group; and m is 1, wherein the thermoplastic resin has a weight reduction proportion at 500° C. of 40% or less.

11. A composition comprising the thermoplastic resin according to claim 1 and a polycarbonate resin.

12. A molded body comprising the thermoplastic resin according to claim 1.

13. An optical lens comprising the thermoplastic resin according to claim 1.

14. An optical lens obtained by molding the composition according to claim 11.

15. A method for producing a thermoplastic resin, comprising polymerizing:

an oxysilane compound comprising dialkyldiaryloxysilane, and dialkyldialkoxysilane; and at least a diol compound represented by the following general formula (IV):

(IV)

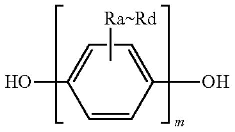

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

the substituent is any of a halogen, a cyano group, an alkenyl group, an alkynyl group, and an alkoxy group; and m is 1, wherein, in the polymerizing, the oxysilane compound and the diol compound are polymerized using a catalyst under reduced pressure in a molten state while a resulting aryl alcohol and/or alkyl alcohol is removed, and a thermoplastic resin including a constituent unit (A) represented by the following general formula (I) is produced:

(I)

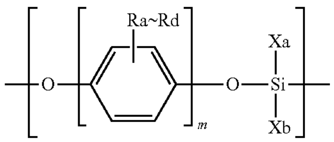

wherein $R_a$ to $R_d$ each independently represent a hydrogen atom, a halogen atom, an alkyl group having 1 to 20 carbon atoms in total and optionally having a substituent, or an aryl group having 6 to 30 carbon atoms in total and optionally having a substituent;

Xa and Xb each independently represent an alkyl group having 1 to 20 carbon atoms in total and optionally having a substituent;

the substituent is any of a halogen, a cyano group, an alkenyl group, an alkynyl group, and an alkoxy group; and m is 1.

16. The method for producing a thermoplastic resin according to claim 15, wherein a catalyst including an alkali metal compound and/or an alkaline earth metal compound is used in the polymerizing.

17. The method for producing a thermoplastic resin according to claim 16, wherein the alkali metal compound and/or the alkaline earth metal compound includes a carbonate salt.

18. The method for producing a thermoplastic resin according to claim 15, wherein a catalyst including a phosphorus compound is used in the polymerizing.

19. The method for producing a thermoplastic resin according to claim 18, wherein the phosphorus compound includes a compound represented by the following general formula (8):

$$(PRe_4)^+(Xc)^- \quad (8)$$

wherein Re each independently represents an alkyl group, an aryl group, or an alkylaryl group, and a plurality of Re are optionally bonded to each other to form a ring structure; and Xc represents a hydroxyl group, a halogen atom, an alkyloxy group, an aryloxy group, an alkylcarbonyloxy group, an arylcarbonyloxy group, $HCO_3$, or $BRf_4$, where Rf is each independently a hydrogen atom, an alkyl group, or an aryl group.

20. The method for producing a thermoplastic resin according to claim 15, wherein the thermoplastic resin has a weight average molecular weight of 10,000 to 300,000.

21. The method for producing a thermoplastic resin according to claim 15, wherein an amount of the catalyst used in the polymerizing relative to the diol compound is $1.0\times10^{-7}$ to $1.0\times10^{-2}$ in a molar ratio.

22. The method for producing a thermoplastic resin according to claim 15, wherein a reaction temperature in the polymerizing is in the range of 150° C. or higher and 300° C. or lower.

23. The method for producing a thermoplastic resin according to claim 15, further comprising, in the polymerizing, pressure reduction in which a reaction pressure is decreased in stages from 24,000 Pa or more to less than 100 Pa.

24. The method for producing a thermoplastic resin according to claim 15, wherein the oxysilane compound and the diol compound are polymerized under a pressure of less than 100 Pa in the polymerizing.

25. The method for producing a thermoplastic resin according to claim 15, wherein no solvent is used in the polymerizing.

26. The method for producing a thermoplastic resin according to claim 15, wherein a ratio of the number of moles of the oxysilane compound to the number of moles of the diol compound used in the polymerizing is 0.9 or more and 1.2 or less.

27. The method for producing a thermoplastic resin according to claim 15, further comprising:

measuring a molecular weight of the thermoplastic resin produced in the polymerizing; and additional polymerizing of repolymerizing the thermoplastic resin having a molecular weight lower than a specific target value.

* * * * *